United States Patent
Minotani et al.

(10) Patent No.: US 11,985,513 B2
(45) Date of Patent: *May 14, 2024

(54) RADIO COMMUNICATION DEVICE AND RADIO COMMUNICATION METHOD

(71) Applicant: Panasonic Intellectual Property Corporation of America, Torrance, CA (US)

(72) Inventors: Jun Minotani, Ishikawa (JP); Atsushi Matsumoto, Ishikawa (JP); Takashi Iwai, Ishikawa (JP); Tomofumi Takata, Ishikawa (JP); Yoshio Urabe, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/167,771

(22) Filed: Feb. 10, 2023

(65) Prior Publication Data

US 2023/0209362 A1  Jun. 29, 2023

Related U.S. Application Data

(63) Continuation of application No. 16/969,699, filed as application No. PCT/JP2019/000516 on Jan. 10, 2019, now Pat. No. 11,611,885.

(30) Foreign Application Priority Data

Feb. 28, 2018 (JP) .................................. 2018-035456

(51) Int. Cl.
*H04W 24/10* (2009.01)
*H04W 16/14* (2009.01)
*H04W 72/54* (2023.01)

(52) U.S. Cl.
CPC .......... *H04W 16/14* (2013.01); *H04W 24/10* (2013.01); *H04W 72/54* (2023.01)

(58) Field of Classification Search
CPC ..... H04W 16/14; H04W 24/10; H04W 72/54; H04W 52/325; H04W 84/12;
(Continued)

(56) References Cited

U.S. PATENT DOCUMENTS 10,117,270 B2  10/2018  Kim et al.
2014/0226505 A1  8/2014  Sadek
(Continued)

FOREIGN PATENT DOCUMENTS

JP  2016510579 A  4/2016
WO  WO 2017155436 A1  9/2017

OTHER PUBLICATIONS

Extended European Search Report dated Mar. 25, 2021, for the corresponding European Patent Application No. 19760899.5, 8 pages.
(Continued)

*Primary Examiner* — Chuong A Ngo
(74) *Attorney, Agent, or Firm* — Seed IP Law Group LLP

(57) ABSTRACT

Provided is a radio communication device capable of reducing interference, caused by non-SR transmission, with a basic service set (BSS) performing spatial reuse (SR) transmission. An SR transmission resource control unit (107) of the radio communication device (SR initiator) (100) determines transmission resources for an SR signal to be transmitted by means of SR to a second BSS other than a first BSS to which the radio communication device (100) belongs on the basis of radio quality information transmitted from other radio communication devices (SR responders) in the (Continued)

first BSS. A radio transmission/reception unit (101) transmits the SR signal by using the determined transmission resources.

13 Claims, 14 Drawing Sheets

(58) Field of Classification Search
CPC .... H04W 72/04; H04W 72/08; H04L 5/0062;
H04L 27/0006
See application file for complete search history.

(56) References Cited

U.S. PATENT DOCUMENTS

| | | |
|---|---|---|
| 2016/0174079 A1 | 6/2016 | Wang et al. |
| 2016/0233940 A1 | 8/2016 | Huang et al. |
| 2017/0142659 A1 | 5/2017 | Noh et al. |
| 2018/0220456 A1* | 8/2018 | Kim ..................... H04W 74/06 |
| 2018/0227952 A1 | 8/2018 | Kim et al. |

OTHER PUBLICATIONS

Fischer et al., "SRP-Based SR Operation," IEEE 802.11-17/0075r8, Mar. 15, 2017, 23 pages.
Fischer et al., "SRP-Based SR for HE Trigger-based PPDU—27.9.3," IEEE 802.11-16/1476r21, Feb. 23, 2017, 36 pages.
International Search Report, dated Mar. 26, 2019, for corresponding International Application No. PCT/JP2019/00516, 4 pages.
Wang et al., "SR Field SRP Table for He Trigger Based PPDU," IEEE 802.11 16/1216r2, Sep. 11, 2016, 24 pages.

* cited by examiner

| RU 1 | RU 2 | ... | RU n |
|---|---|---|---|
| SENDABLE | SENDABLE | ... | UNSENDABLE |

FIG. 9

| Channel 1 | Channel 2 | ... | Channel n |
|---|---|---|---|
| SENDABLE | SENDABLE | ... | UNSENDABLE |

FIG. 10

| SRG | Non-SRG |
|---|---|
| SENDABLE | UNSENDABLE |

FIG. 11

| BSS color 1 | BSS color 2 | ... | BSS color n |
|---|---|---|---|
| SENDABLE | SENDABLE | ... | UNSENDABLE |

FIG. 12

RADIO COMMUNICATION DEVICE AND RADIO COMMUNICATION METHOD

TECHNICAL FIELD

The present disclosure relates to a radio communication apparatus and a radio communication method.

BACKGROUND ART

In Task Group ax of the Institute of Electrical and Electronics Engineers (IEEE) 802.11 working group, the technical specification of IEEE 802.11ax (hereinafter, referred to as "11ax") has been standardized as the next standard of 802.11ac.

In the IEEE 802.11 standard, Basic Service Set (BSS) is defined as a set of terminals (sometimes called "station (STAs)") that form a basic radio network. The BSS is formed of one access point (sometimes called "access point (AP)" or "base station") and a plurality of terminals in the infrastructure mode and is formed of a plurality of terminals in the ad hoc mode.

A BSS other than the BSS (intra-BSS) to which the terminal belongs is called "Overlapping BSS (OBSS) or inter-BSS." In an environment where a plurality of BSSs exist adjacently, a radio wave interference from a surrounding OBSS increases, and the system performance degrades due to a decrease in transmission opportunities.

In this respect, in 11ax, in order to improve the system performance in an environment where BSSs exist densely, the introduction of spatial reuse (SR) which obtains a transmission opportunity by reusing the radio resource used by an OBSS has been specified (e.g., see Non-Patent Literature (hereinafter, referred to as "NPL") 1).

In NPL 1, two SRs called "OBSS Packet Detect (OBSS PD)-based SR" and "SRP based SR" are defined. In OBSS PD-based SR, STAs obtain a transmission opportunity by dynamically controlling a clear channel assessment (CCA) threshold based on the received power of a signal received from an OBSS (hereinafter, referred to as an "OBSS signal") and a BSS-identifier (BSS color) of the OBSS. Further, in SRP based SR, STAs derive a transmission power that satisfies the condition that the transmission power does not exceed the interference allowable value of the OBSS, based on the interference allowable value ("spatial reuse parameter (SRP)") obtained from the OBSS signal and the received signal strength ("received signal strength indication (RSSI)") of the OBSS signal. The STA obtains a transmission opportunity by transmitting a signal with the derived transmission power while reducing the interference given to the OBSS (e.g., see NPL 2).

Note that, in the following description, transmission to which the SR is applied is referred to as "SR transmission," and transmission to which the SR is not applied is referred to as "Non-SR transmission." Further, in the following description, the signal to be transmitted by SR transmission is referred to as "SR signal," and the signal to be transmitted by Non-SR transmission is referred to as "Non-SR signal."

CITATION LIST

Non-Patent Literatures

NPL 1
  IEEE 802.11-17/0075r8 "SRP-Based SR Operation"
NPL 2
  IEEE 802.11-16/1476r21 "SRP based SR for HE Trigger-based PPDU"
NPL 3
  IEEE 802.11-16/1216r2 "SR Field SRP Table for HE Trigger-Based PPDU"

SUMMARY

However, while the reduction of interference given to an OBSS by SR transmission is taken into consideration, the reduction of interference given to the BSS performing SR transmission by Non-SR transmission is not sufficiently discussed.

One aspect of the present disclosure facilitates providing a radio communication apparatus and a radio communication method each enabling reduction of the interference given by Non-SR transmission to the BSS that performs SR transmission.

A radio communication apparatus according to one aspect of the present disclosure includes: control circuitry, which, in operation, determines a transmission resource for a Spatial Reuse (SR) signal based on radio quality information transmitted from another radio communication apparatus in a first Basic Service Set (BSS), the SR signal being transmitted by SR for a second BSS which is a BSS other than the first BSS; and transmission circuitry, which, in operation, transmits the SR signal, using the transmission resource.

A radio communication method according to one aspect of the present disclosure includes: determining a transmission resource for a Spatial Reuse (SR) signal based on radio quality information transmitted from another radio communication apparatus in a first Basic Service Set (BSS), the SR signal being transmitted by SR for a second BSS other than the first BSS; and transmitting the SR signal, using the transmission resource.

Note that general or specific embodiments may be implemented as a system, an apparatus, a method, an integrated circuit, a computer program or a recording medium, or any selective combination of the system, the apparatus, the method, the integrated circuit, the computer program, and the recording medium.

According to one aspect of the present disclosure, the interference given by Non-SR transmission to the BSS that performs SR transmission can be reduced.

Additional benefits and advantages of the disclosed exemplary embodiments will become apparent from the specification and drawings. The benefits and/or advantages may be individually obtained by various embodiments and features of the specification and drawings, which need not all be provided in order to obtain one or more of such benefits and/or advantages.

BRIEF DESCRIPTION OF DRAWINGS

FIG. 9 is a diagram illustrating an example of SR availability information in units of RUs, according to Embodiment 1;

FIG. 10 is a diagram illustrating an example of SR availability information in units of 20 MHz, according to Embodiment 1;

FIG. 11 is a diagram illustrating an example of SR availability information on SRG and Non-SRG, according to Embodiment 2;

FIG. 12 is a diagram illustrating an example of SR availability information in units of BSS colors, according to Embodiment 2;

DESCRIPTION OF EMBODIMENTS

Hereinafter, a detailed description will be given of embodiments of the present disclosure with reference to the accompanying drawings.

SRP based SR

Figure 1:
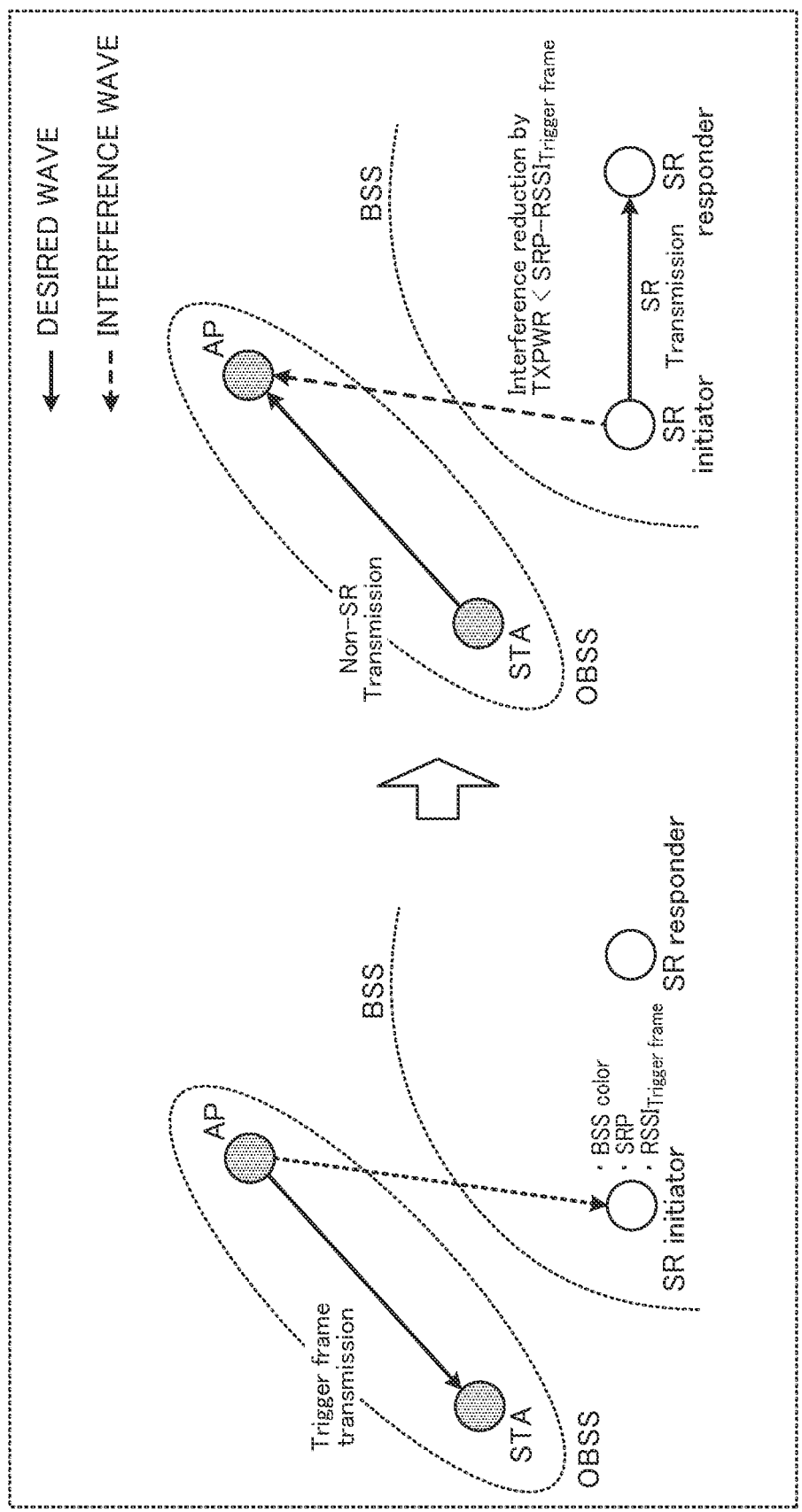
FIG. 1 is a diagram illustrating an operation example of SRP-based SR.

SRP based SR will be described in detail with reference to FIG. 1.

An AP (OBSS AP) that belongs to an OBSS existing around its BSS transmits a trigger frame which is a control signal prompting transmission of an uplink signal (e.g., Orthogonal Frequency Division Multiple Access (OFDMA)) signal and which is addressed to the STA (OBSS STA) in the OBSS to which the AP belongs. The data frame including the trigger frame herein is called "Delayed SRP Physical layer Protocol Data Unit (DSRP PPDU)." The SR initiator of its BSS receives a DSRP PPDU transmitted from the OBSS AP to the OBSS STA (see left side of FIG. 1).

Note that, "SR initiator" is an apparatus (AP or STA) that attempts SR transmission when the SRP obtained by the received OBSS signal takes a predetermined value. Further, an apparatus (AP or STA) which is a communication counterpart of the SR initiator in the SR transmission is called "SR responder."

The SR initiator derives transmission power that reduces interference to an OBSS for the purpose of reusing the radio resource used by the OBSS.

Specifically, the SR initiator acquires a BSS color included in SIG-A-field of the received DSRP PPDU and the SRP of OBSS AP defined by a value of Spatial reuse subfield in Common field of the trigger frame (e.g., see NPL 3). The SRP is expressed by the following Equation 1.

$$SRP = TXPWR_{AP} + \text{Acceptable receiver interference level}_{AP} \quad (1)$$

In Equation 1, $TXPWR_{AP}$ indicates the transmission power of an OBSS AP, and

Acceptable receiver interference level$_{AP}$ indicates the allowable interference level of the OBSS AP.

The SR initiator also measures an RSSI ($RSSI_{Trigger\ frame}$) of the received DSRP PPDU.

The SR initiator then derives the transmission power ($TXPWR_{SR\ initiator}$) for the SR signal from the following Equation 2, using an SRP and RSSI.

$$TXPWR_{SR\ initiator} < SRP - RSSI_{trigger\ frame} \quad (2)$$

The SR initiator transmits the SR signal to the SR responder, using the derived transmission power. Using the transmission power derived from Equation 2 makes it possible to reduce the interference given to the OBSS by SR-transmission from the SR initiator to the SR responder (see right side of FIG. 1).

In SRP-based SR, the SR initiator reuses the radio resource by transmitting an SR signal with the derived transmission power to the SR responder that belongs to the same BSS as the SR initiator during a period (SRP opportunity) in which an uplink signal of the OBSS STA detected from the trigger frame is transmitted, thereby improving the system performance.

In a case where the SR initiator performs SR transmission to the SR responder with the transmission power with reduced interference given to OBSS, herein, the SR signal is transmitted with a transmission power lower than the normal transmission power. For this reason, it is desirable that the interference in the SR responder be low.

Figure 2:
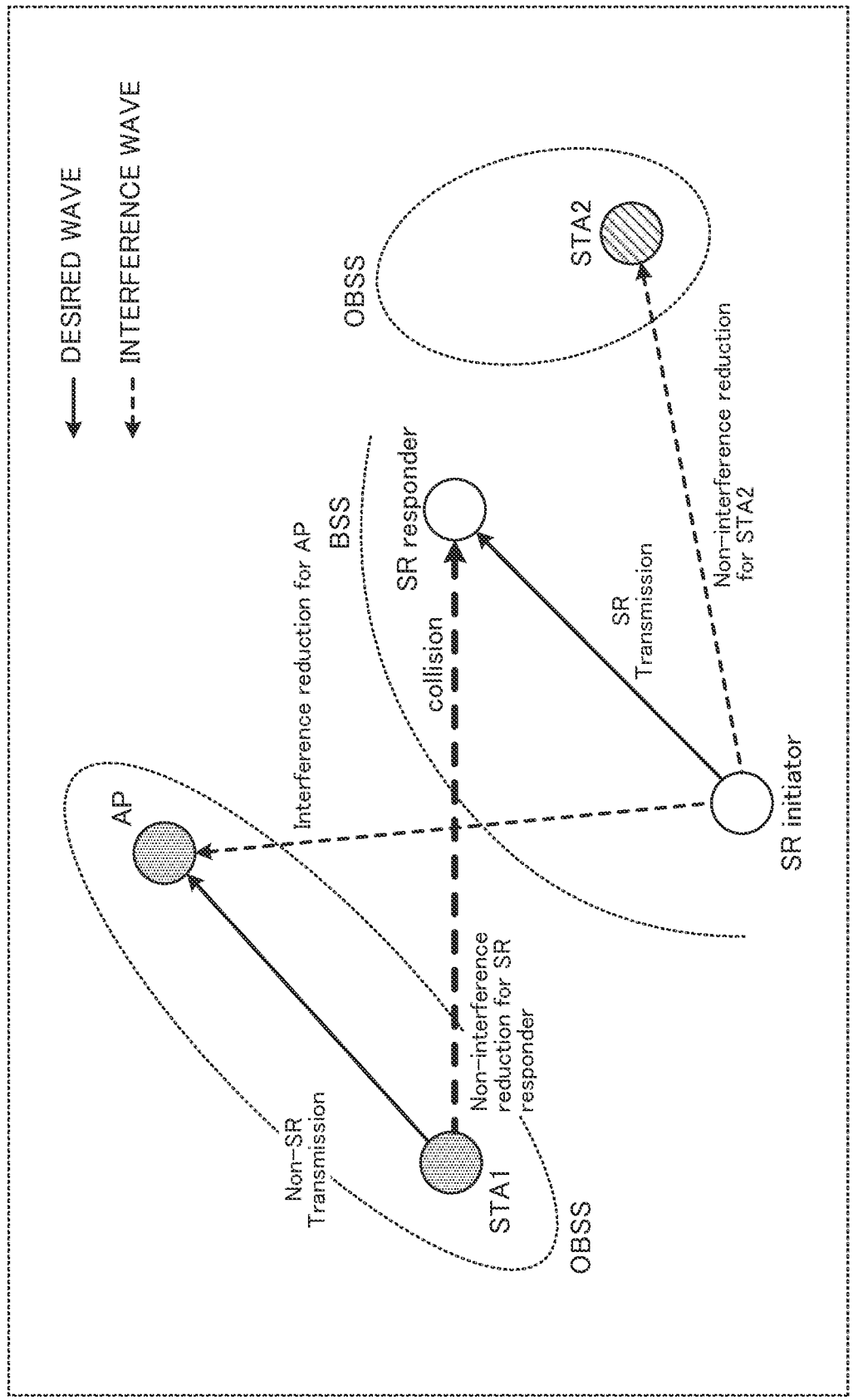
FIG. 2 is a diagram provided for describing a problem in SRP-based SR.

However, as illustrated in FIG. 2, in a case where the SR responder is adjacent to the OBSS (STA1 in FIG. 2), the Non-SR transmission in the OBSS (STA1) becomes large interference to the SR responder, there arises a concern that the reception success rate of the SR signal in the SR responder is reduced. Further, the SR signal that has not been successfully received in the SR responder possibly becomes an interference source with respect to the OBSS which is closer to the SR initiator than the OBSS subject to the interference reduction taget (OBSS including the AP in FIG. 2), and which is not subject to the interference reduction (OBSS including STA2 in FIG. 2).

Thus, depending on the radio channel state of the SR responder, there arises a case where the interference is given from the OBSS in the SR transmission, and the reception success rate of the SR signal in SR responder is reduced, resulting in degradation of the system performance.

Thus, in one aspect of the present disclosure, a method for reducing the interference given from an OBSS in SR transmission will be described.

Embodiment 1

Configuration of Radio Communication System

In a radio communication system according to the present embodiment, a plurality of BSSs adjacently exist. In the radio communication system, at least one of the apparatuses (STAs or APs) that form a BSS performs SRP-based SR (i.e., reuse of radio resources used by OBSS) with respect to a surrounding OBSS.

Hereinafter, an SR initiator (radio communication apparatus) 100 and SR responder (radio communication apparatus) 200 for performing SRP-based SR are provided as examples. That is, radio communication apparatus 100 transmits an SR signal to radio communication apparatus 200. For example, the SR initiator is an STA and the SR responder is an AP.

Figure 3:
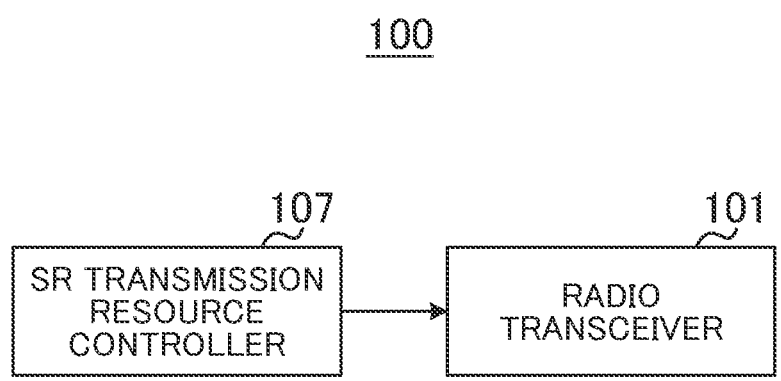
FIG. 3 is a block diagram illustrating a configuration example of a part of a radio communication apparatus according to Embodiment 1.

FIG. 3 is a block diagram illustrating a part of a configuration of radio communication apparatus 100 (SR initiator) according to the present embodiment. In radio communication apparatus 100 illustrated in FIG. 3, SR transmission resource controller 107 determines a transmission resource for the SR signal transmitted by SR (e.g., SRP-based SR) with respect to a second BSS (i.e., OBSS) other than a first BSS, based on radio quality information transmitted from another radio communication apparatus (SR responder) in the first BSS. Radio transceiver 101 transmits the SR signal, using the transmission resource.

Configuration of SR Initiator

Figure 4:
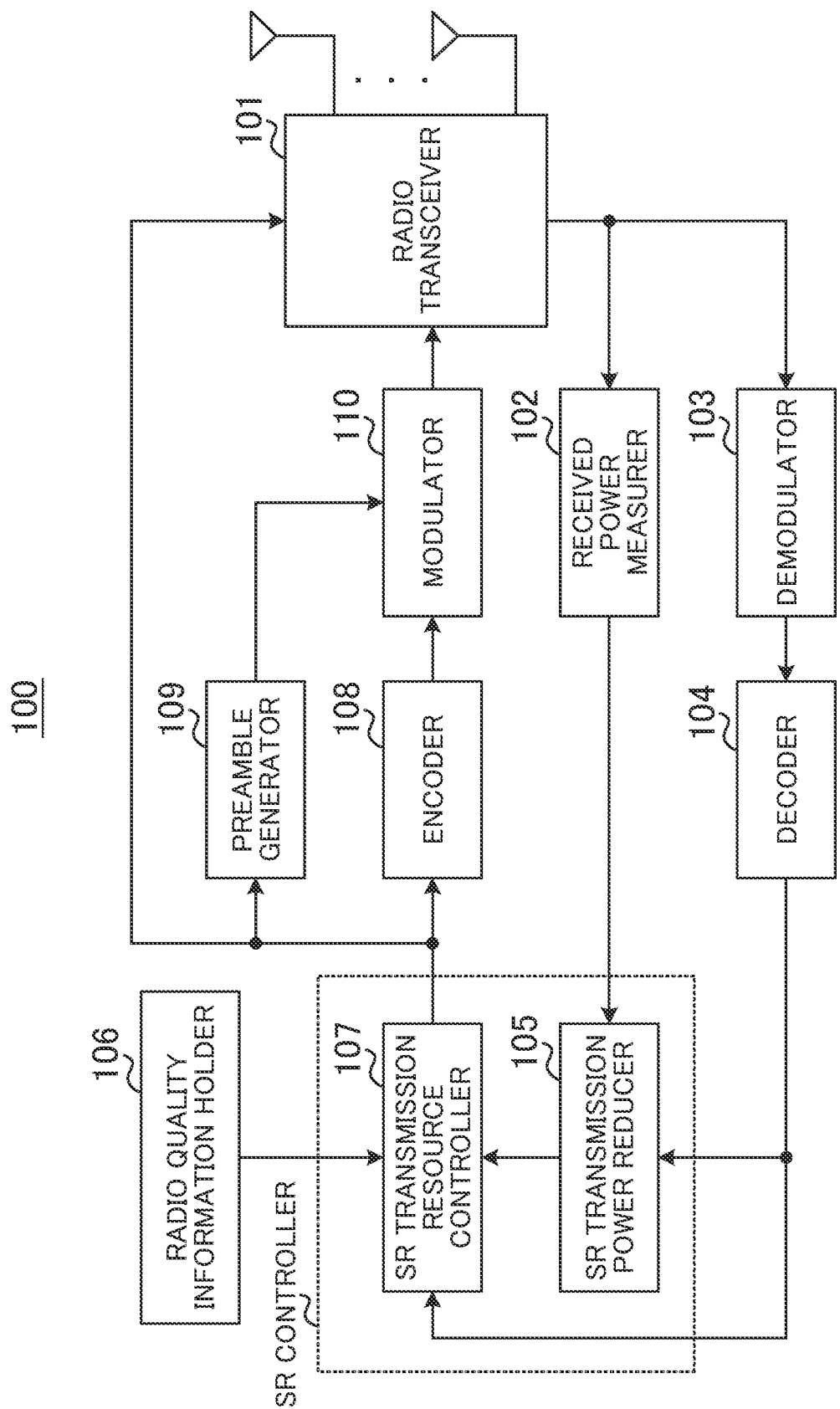
FIG. 4 is a block diagram illustrating a configuration example of a part of a radio communication apparatus (SR initiator) according to Embodiment 1.

FIG. 4 is a block diagram illustrating a configuration example of radio communication apparatus 100 (SR initiator) according to the present embodiment. Radio communication apparatus 100 determines a transmission resource for the SR signal based on radio quality information from radio communication apparatus 200, which is the SR responder, and transmits the SR signal within a predetermined period.

Radio communication apparatus 100 includes radio transceiver 101, received power measurer 102, demodulator 103, decoder 104, SR transmission power reducer 105, radio quality information holder 106, SR transmission resource controller 107, encoder 108, preamble generator 109, and modulator 110. Incidentally, SR transmission power reducer 105 and SR transmission resource controller 107 form an SR controller.

Radio transceiver 101 receives a radio signal (OBSS signal) transmitted from an OBSS (e.g., OBSS AP or OBSS STA) via an antenna, applies predetermined radio reception processing, such as down-conversion and/or A/D conversion to the radio signal, and outputs the received signal after the radio reception processing to received power measurer 102 and demodulator 103.

Further, radio transceiver 101 applies predetermined radio transmission processing, such as D/A conversion and/or upconversion into a carrier frequency, to a packet signal inputted from modulator 110, and transmits, via the antenna, a high-frequency signal (i.e., SR signal) amplified according to the transmission power indicated by the transmission power information (to be described, hereinafter) inputted from SR transmission resource controller 107.

Received power measurer 102 measures the received power (e.g., RSSI), using the received signal (i.e., OBSS signal) inputted from radio transceiver 101 and outputs the measured RSSI to SR transmission power reducer 105.

Demodulator 103 detects a preamble included in the received signal inputted from radio transceiver 101, extracts the received data including a trigger frame, based on the control information included in the preamble, and demodulates the received data. Demodulator 103 outputs the control information and the received data after the demodulation to decoder 104.

Decoder 104 decodes the received data based on the control information included in the preamble inputted from demodulator 103 and acquires a trigger frame. Then, decoder 104 outputs the decoded trigger frame and the control information included in the preamble to SR transmission power reducer 105 and SR transmission resource controller 107.

SR transmission power reducer 105 determines the presence or absence of allowance for SR transmission based on the control information included in the trigger frame inputted from decoder 104. For example, SR transmission power reducer 105 determines that SR-transmission is allowed when the value of the spatial reuse subfield included in the common field of the trigger frame is other than "SRP_DISALLOW" and "SRP_AND_NON-SRG_OBSS-PD_PROHIBITED." That is, SR transmission power reducer 105 determines that SR transmission is not allowed (disallowed) when the value of spatial reuse subfield is "SRP_DISALLOW" or "SRP_AND_NON-SRG_OBSS-PD_PROHIBITED."

When determining that the SR transmission is allowed, SR transmission power reducer 105 reduces the transmission power in SR transmission. Specifically, SR transmission power reducer 105 determines the transmission power ($TXPWR_{SR}$ initiator) satisfying Equation 2, using the SRP [dBm] included in the trigger frame and RSSI ($RSSI_{trigger\,frame}$) of the trigger frame inputted from received power measurer 102. SR transmission power reducer 105 outputs the information indicating the determined transmission power to SR transmission resource controller 107.

Meanwhile, when determining that the SR transmission is disallowed, SR transmission power reducer 105 cancels the SR transmission by outputting nothing to SR transmission resource controller 107 (output OFF) or outputting information indicating that no SR transmission has been performed to SR transmission resource controller 107. Further, SR transmission power reducer 105 may cancel SR transmission in a case where reduction to the transmission power satisfying Equation 2 is impossible, for example, due to constraints on implementation and/or the like.

Radio quality information holder 106 holds the radio quality information received from radio communication apparatus 200 (SR responder). For example, radio quality information may be indicated from radio communication apparatus 200 via a management frame or a control frame in a predetermined cycle or at a predetermined timing. Further, the radio quality information may be information indicating radio quality for each predetermined band. For example, radio quality information holder 106 outputs the most recently received radio quality information to SR transmission resource controller 107. Note that, the radio quality information will be described in detail, hereinafter.

SR transmission resource controller 107 determines the SR transmission resource (e.g., time resource, frequency resource, transmission power resource) for the SR signal to be transmitted in the SR transmission for the OBSS. For example, SR transmission resource controller 107 configures the time resource (also referred to as SRP opportunity) of the SR signal to be a time shorter than the trigger-based PPDU, based on the information on the packet length of trigger-based PPDU (Non-SR signal) acquired from the trigger frame. Further, SR transmission resource controller 107 determines the availability of SR transmission for each band, based on radio quality information for each predetermined band inputted from radio quality information holder 106 for the frequency resource. Note that, SR transmission resource controller 107 may cancel the SR transmission when there is no SR-sendable band. Further, SR transmission resource controller 107 also configures the transmission power indicated in the information inputted from SR transmission power reducer 105 for transmission power resource.

SR transmission resource controller 107 outputs the information indicating the determined SR transmission resource (time resource information, transmission band information, and/or transmission power information) to each of encoder 108, preamble generator 109, and radio transceiver 101.

Note that, a detailed description of a determination method for a frequency resource of an SR signal in SR transmission resource controller 107 will be given, hereinafter.

Encoder 108 determines a PHY service data unit (PSDU) length that is sendable in an interval indicated by the time resource information inputted from SR transmission resource controller 107, encodes the SR signal (including data and/or the like), using a modulation and coding scheme (MCS) obtained from a received quality estimation value (such as radio quality information) in radio communication apparatus 200 (SR responder), and outputs the encoded signal to modulator 110.

Preamble generator 109 generates a preamble including control information including band allocation information for the SR signal (also referred to as RU allocation information) and a reference signal, based on the transmission band information inputted from SR transmission resource controller 107, and outputs the generated preamble to modulator 110. Note that, a detailed description of a generation method for band allocation information for SR signals will be given, hereinafter.

Modulator 110 applies modulation (e.g., quadrature amplitude modulation (QAM) modulation) to the signal inputted from encoder 108. Modulator 110 then allocates the modulation signal to the band (SR-sendable band) indicated in the band allocation information for the SR signal included in the preamble and applies Inverse Fast Fourier Transform (IFFT) processing to generate an orthogonal frequency division multiplexing (OFDM) signal, and generates a data signal composed of an OFDM signal. Then, modulator 110 generates a radio frame (packet signal) in which a preamble is added to the data signal, and outputs the packet signal to radio transceiver 101.

Configuration of SR Responder

Figure 5:
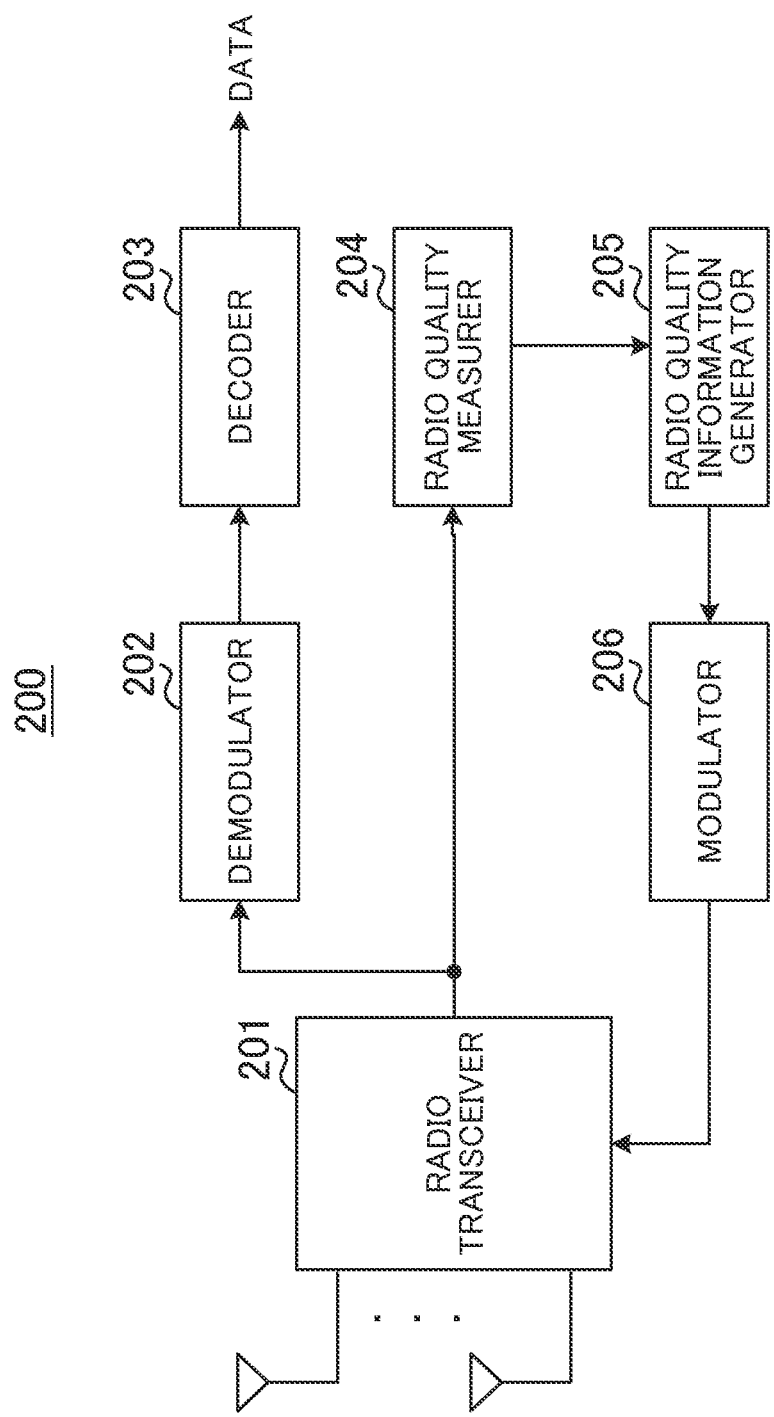
FIG. 5 is a block diagram illustrating a configuration example of a part of a radio communication apparatus (SR responder) according to Embodiment 1.

FIG. 5 is a block diagram illustrating a configuration of radio communication apparatus 200 (SR responder) according to the present embodiment. Radio communication apparatus 200 transmits the radio quality information (e.g., information on interference level, such as Signal to Interference and Noise Ratio (SINR)) for each predetermined band to radio communication apparatus 100, which is an SR initiator, and receives the SR signal from radio communication apparatus 100.

Radio communication apparatus 200 includes radio transceiver 201, demodulator 202, decoder 203, radio quality measurer 204, radio quality information generator 205, and modulator 206.

Radio transceiver 201 receives a signal from a BSS (e.g., SR initiator) or an OBSS (e.g., OBSS AP or OBSS STA) via an antenna, applies predetermined radio reception processing, such as down-conversion and/or A/D conversion to the received signal, and outputs the received signal after the radio reception processing to demodulator 202 or radio quality measurer 204.

Further, radio transceiver 201 applies predetermined radio transmission processing, such as D/A conversion and/or up-conversion into the carrier frequency to the signal (including radio quality information) inputted from modulator 206, and broadcasts the radio quality information via the antenna to the STAs (including radio communication apparatus 100) in the BSS to which the apparatus belongs.

Demodulator 202 detects a preamble from the received signal inputted from radio transceiver 201 and acquires the frequency allocation information from the band allocation information included in the preamble. Then, demodulator 202 extracts the radio frame containing the desired data (corresponding to the SR signal) based on the frequency allocation information, and outputs the radio frame to decoder 203.

Decoder 203 decodes the received data (SR signal) based on the control information included in the received signal inputted from demodulator 202, and acquires the data included in the SR signal.

Radio quality measurer 204 measures the radio quality (received power or interference level), using the received signal (e.g., an OBSS signal or the signal of BSS to which the apparatus belongs) inputted from radio transceiver 201 and outputs the measurement result to radio quality information generator 205. Note that, a detailed description of the radio quality measurement in radio quality measurer 204 will be given, hereinafter.

Radio quality information generator 205 generates radio quality information including the measurement result inputted from radio quality measurer 204 and outputs the radio quality information to modulator 206.

Radio quality information generator 205, for example, generates a management frame or a control frame addressed to the SR initiator (radio communication apparatus 100) including the measurement result inputted from radio quality measurer 204. When the SR responder is an AP, for example, radio quality information generator 205 may use a beacon frame which is a management frame, or a trigger frame which is a control frame. Further, when the SR responder is an STA, radio quality information generator 205 may use a bandwidth query report (BQR) as a response to the trigger frame that is transmitted by the AP (radio communication apparatus 100), which is the SR initiator, and whose trigger type is bandwidth query report poll (BQRP).

Modulator 206 assigns the signal resulting from the application of modulation to the radio quality information inputted from radio quality information generator 205 to a predetermined band, and outputs the signal to radio transceiver 201.

Operations of Radio Communication Apparatus 100 and Radio Communication Apparatus 200

Next, a detailed description will be given of operations of radio communication apparatus 100 and radio communication apparatus 200 of the present embodiment.

In the present embodiment, an SR initiator (radio communication apparatus 100) determines an SR transmission resource (including a transmission band and transmission power) for the SR signal based on the radio quality information from the SR responder (radio communication apparatus 200).

Figure 6:
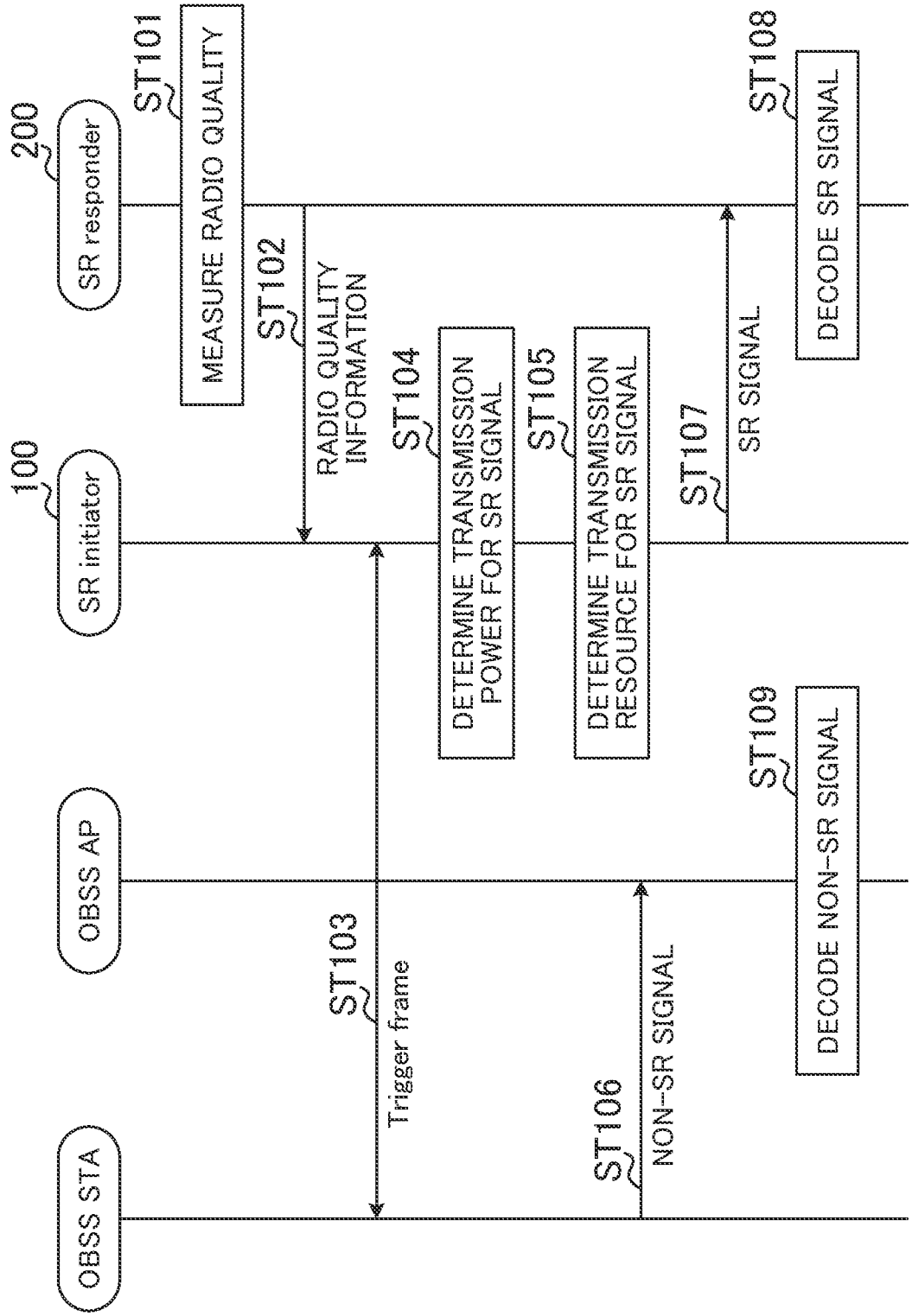
FIG. 6 is a sequence diagram illustrating an operation example of a system according to Embodiment 1.

FIG. 6 is a sequence diagram illustrating an operation example of a radio communication system according to the present embodiment. FIG. 6 illustrates an operation of a case where the SR initiator and SR responder which belong to a predetermined BSS apply SRP-based SR to an OBSS (including OBSS AP and OBSS STA) adjacent to the BSS.

In FIG. 6, the SR responder (radio quality measurer 204) measures the received power level or interference level for each predetermined band, using a signal from a predetermined BSS or OBSS and generates radio quality information based on the measurement result (ST101). Then, the SR responder broadcasts the signal including the generated radio quality information to the STAs (including the SR initiator) in the BSS (ST102).

Note that, in ST102, the radio quality information may be broadcasted at a predetermined timing or in a predetermined cycle defined in advance. For example, the SR responder may measure the radio quality in a predetermined cycle in ST101 and broadcast the radio quality information each time the radio quality is measured, or the radio quality information may be broadcasted at a timing other than the timings described above.

The OBSS AP generates a trigger frame prompting an uplink transmission to an OBSS STA and transmits the trigger frame addressed to the OBSS STA (ST103). The trigger frame transmitted from the OBSS AP to the OBSS STA is also received by the SR initiator.

The SR initiator (SR transmission power reducer 105) determines the transmission power for the SR signal for reducing the interference to the OBSS AP (hereinafter, may be referred to as SR transmission power), using the interference allowable value (SRP) of the OBSS AP acquired from the trigger frame received from the OBSS AP in ST103, and the RSSI measured using the trigger frame (ST104).

The SR initiator (SR transmission resource controller 107) determines an SR transmission period (SRP opportunity, i.e., time resource) based on information on the packet-length of the non-SR signal that is transmitted by the OBSS STA and that is acquired from the trigger frame received from the OBSS AP in ST103 (ST105). Further, the SR initiator (SR transmission resource controller 107) determines a transmission resource (frequency resource) for the SR signal with which a desired received quality can be expected, based on the radio quality information for each predetermined band received from the SR responder in ST102 (ST105).

Note that, in ST105, the SR initiator determines the transmission resource for the SR signal when transmitting the SR signal in a Non-SR signal transmission period (also called SRP opportunity) obtained based on the trigger frame received in ST103, for example, and the SR initiator may not determine a transmission resource for the SR signal when not transmitting the SR signal in the Non-SR signal transmission period (e.g., when unsendable). This allows the SR initiator to perform the transmission resource control for the SR signal only when transmission of an SR signal is required, so that it is possible to reduce the processing amount.

Meanwhile, the OBSS STA transmits an uplink signal (i.e., Non-SR signal) to the OBSS AP based on an indication by the trigger frame received from the OBSS AP in ST103 (ST106).

The SR initiator transmits the SR signal to the SR responder in the SR transmission period (SRP opportunity) determined in ST105, using the SR transmission power determined in ST104 and the transmission resource determined in ST105 (ST107).

The SR responder receives the SR signal transmitted from the SR initiator in ST107 and decodes the received SR signal (ST108).

Further, the OBSS AP also receives the Non-SR signal transmitted from the OBSS STA in ST106 and decodes the received Non-SR signal (ST109).

Figure 7:
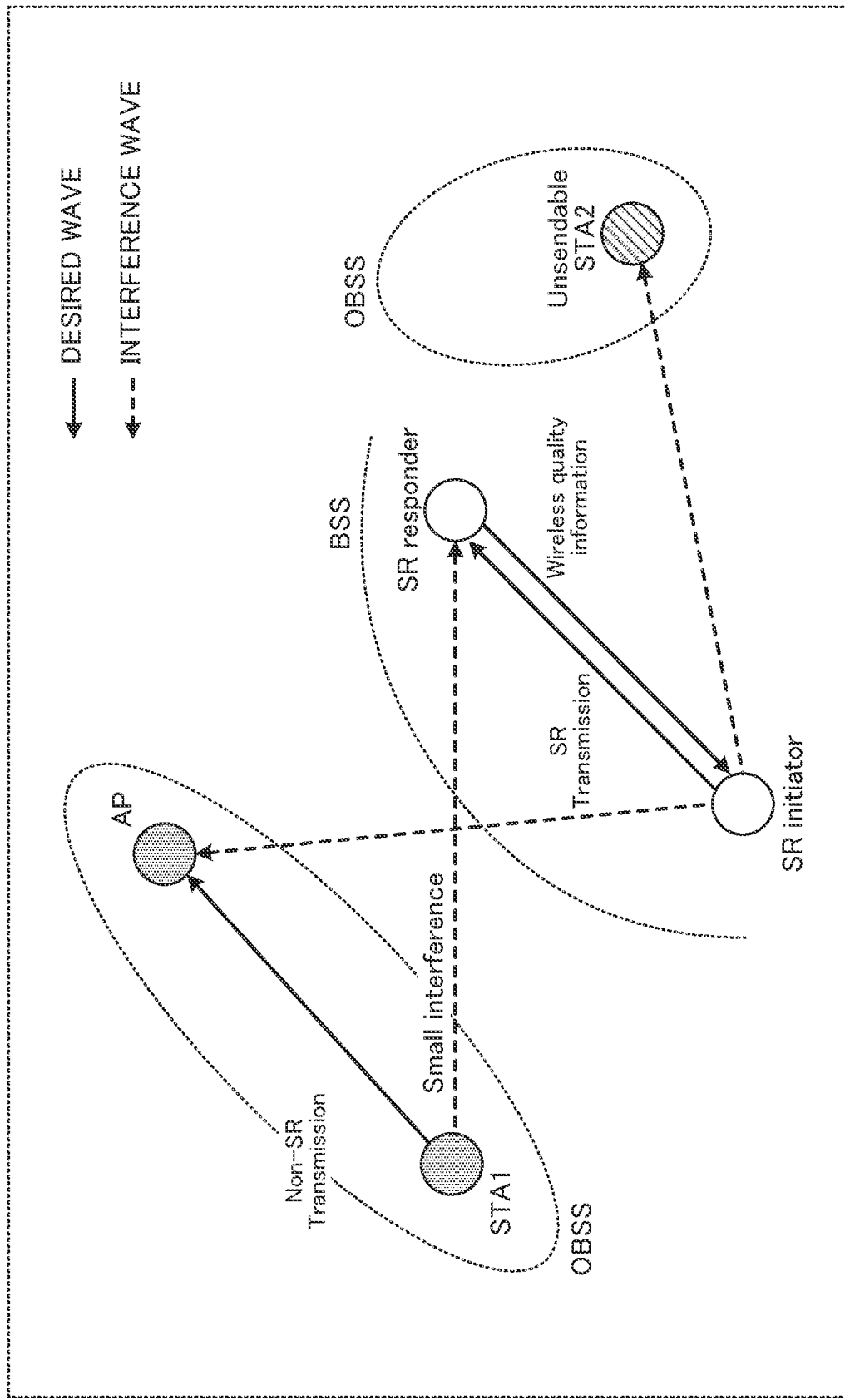
FIG. 7 is a diagram illustrating an operation example of SRP-based SR according to Embodiment 1.
Figure 8:
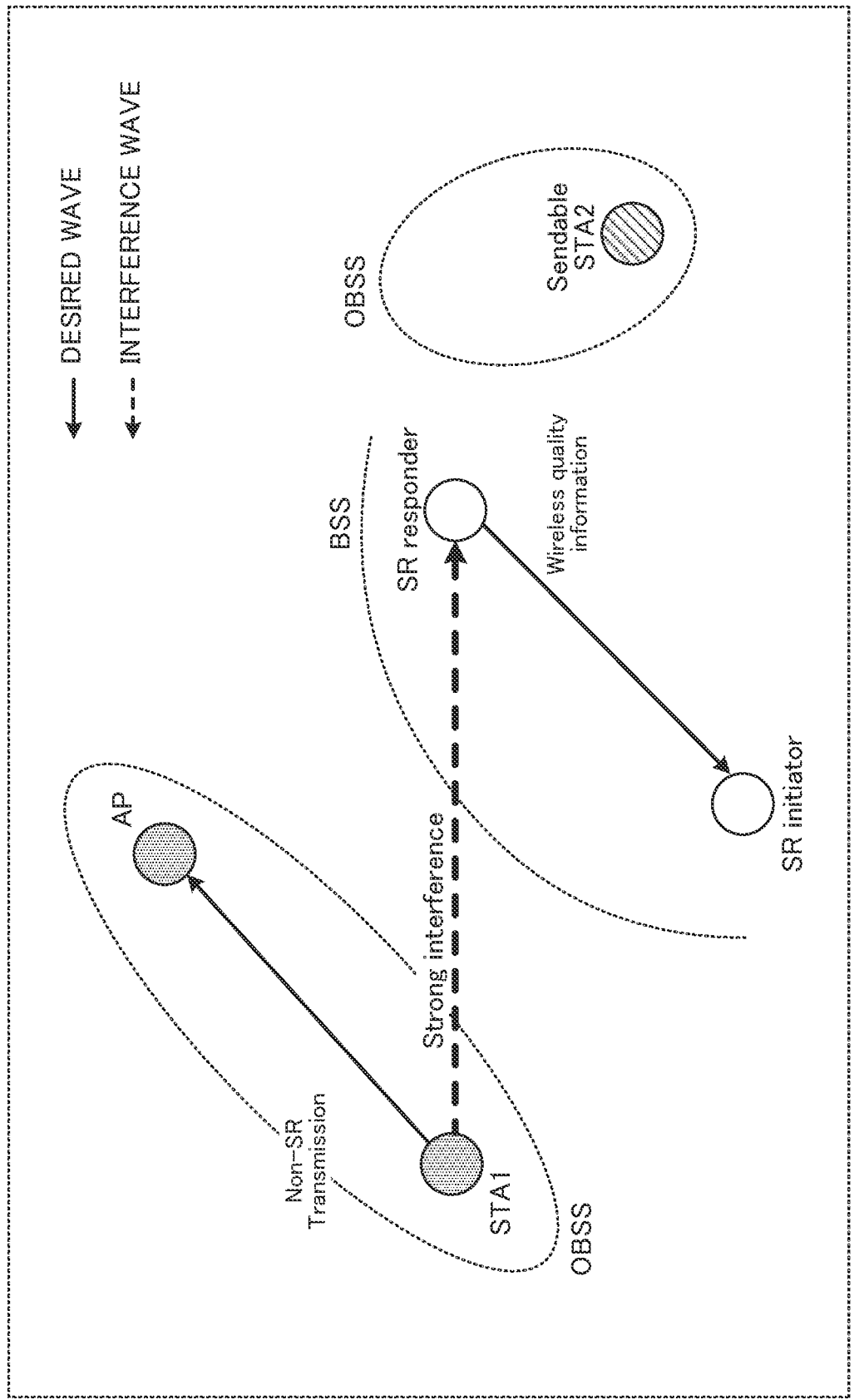
FIG. 8 is a diagram illustrating an operation example of SRP-based SR according to Embodiment 1.

FIGS. 7 and 8 illustrate operation examples of SRP-based SR (SR resource control using radio quality information) according to the present embodiment.

In FIG. 7, the SR responder broadcasts the radio quality information indicating that the interference given from the OBSS is small to the SR initiator. In this case, the SR initiator determines that the SR transmission is available, based on the received radio quality information. In this respect, the SR initiator performs an SR transmission, using an available transmission resource (i.e., a transmission resource to which the interference given from the OBSS is small and with which a desired received quality can be expected).

That is, in FIG. 7, the SR initiator transmits the SR signal, using a resource with the interference given due to a Non-SR signal from the OBSS STA is small, so that it is possible to reduce the occurrence of a decoding error of the SR signal in the SR responder.

Further, in FIG. 7, the SR signal transmitted from the SR initiator possibly becomes interference to the OBSS AP. However, the transmission power control (ST104 in FIG. 6) in the SR initiator reduces the transmission power such that the interference power is equal to or less than the allowable value. This reduces the occurrence of decoding errors of Non-SR signals in OBSS APs.

Further, in FIG. 7, an OBSS which is not subject to the interference reduction processing for SR transmission (STA2 in FIG. 7) cannot perform transmission due to the interference given by the SR transmission.

Meanwhile, in FIG. 8, the SR responder broadcasts the radio quality information indicating that the interference given from the OBSS is large to SR initiators. In this case, the SR initiator determines that SR transmission is not available, based on the received radio quality information. Therefore, the SR initiator cancels the SR transmission.

That is, in FIG. 8, the SR initiator does not perform SR transmission with a resource where the interference due to the Non-SR signal from an OBSS STA is large and an decoding error of the SR signal in the SR responder is likely to occur. Thus, since no SR signal transmitted in FIG. 8, it is possible to reduce the occurrence of decoding errors of the Non-SR signal in the OBSS AP. Furthermore, in FIG. 8, an OBSS which is not subject to the interference reduction processing for SR transmission (STA2 in FIG. 8) can perform transmission because there is no interference by SR transmission.

As illustrated in FIGS. 7 and 8, the SR initiator determines a transmission resource (bandwidth) with which an SR signal is sendable (hereinafter, may be referred to as "sendable transmission resource") taking the interference due a Non-SR signal transmitted from an OBSS (OBSS STA, herein) into consideration, based on the radio quality information from the SR responder, and transmits SR in a resource other than the sendable transmission resource. Accordingly, even when a Non-SR signal possibly becomes the interference depending on a radio channel condition (such as a surrounding environment) of the SR responder, the SR signal is transmitted in a band where the interference is small, and no SR signal is transmitted in a band where the interference is likely to be received. Thus, the occurrence of decoding errors of SR signals in SR responders can be reduced.

Determination Method for Frequency Resource for SR signals

Next, a detailed description will be given of a determination method for a frequency resource for SR signals in SR transmission resource controller 107 of radio communication apparatus 100 (SR initiator).

SR transmission resource controller 107 determines the frequency resource for an SR signal based on the radio quality information received from radio communication apparatus 200 (SR responder).

Radio Quality Information

The radio quality information, herein is the information indicating the radio quality generated by the SR responder for each predetermined band, and indicates, for example, the following information.
(1) CCA result (Idle/Busy) indicating whether or not SR responder can receive the SR signal (i.e., whether or not SR initiator can transmit the SR signal).
(2) Information indicating whether the interference level measured by the SR responder is above or below a predetermined threshold.
(3) Interference level measured by SR responder.
(4) Received quality information (e.g., SINR) from SR initiator to SR responder.

For example, in case of (2), when receiving radio quality information indicating that the interference level is lower than a predetermined threshold, SR transmission resource controller 107 may determine that the SR signal can be received in the SR responder. Further, in case of (3), SR transmission resource controller 107 determines whether or not the interference level is lower than a predetermined threshold, and when the interference level is lower than the threshold, SR transmission resource controller 107 may determine that the SR signal can be received in the SR responder. In case of (4), SR transmission resource controller 107 determines whether or not SINR is greater than a predetermined threshold, and when SINR is greater than the threshold, SR transmission resource controller 107 may determine that the SR signal can be received in the SR responder.

The predetermined band where the radio quality information is defined may be, for example, a band of the smallest allocation unit (in unis of RUs (Resource Units) of OFDMA, as illustrated in FIG. 9. FIG. 9 indicates, as an example, radio quality information (SR availability information) for each RU indicating whether or not the SR initiator in the case of (1) can transmit the SR signal (sendable/unsendable).

In FIG. 9, SR transmission resource controller 107 allocates a frequency resource for the SR signal to the RU (RU with low interference level) with which SR transmission is allowed. Meanwhile, SR transmission resource controller 107 does not allocate a frequency resource for the SR signal to the RU with which SR transmission is not allowed (RU with higher interference level).

The Non-SR signal from an OBSS STA indicated by a trigger frame, herein, is an UL OFDMA signal, and is the signal resulting from multiplexing of signals from a plurality of STAs by frequency multiplexing in units of RUs. For this reason, in Non-SR signals, it is assumed that the interference level fluctuates greatly in units of RUs depending on OFDMA allocation by a plurality of STAs.

Therefore, defining the radio quality information in units of RUs allows SR transmission resource controller 107 to allocate a frequency resource for SR signals taking into consideration the increase or decrease of the interference level depending on OFDMA allocation of the STA that transmits a Non-SR signal. Thus, it is made possible to prevent a decrease in the reception success rate of the SR signal in the SR responder and thus to improve the system performance.

Alternatively, the predetermined band defining the radio quality information may be, for example, a band in units of 20 MHz bands as illustrated in FIG. 10. FIG. 10 illustrates, as an example, the radio quality information (SR availability information) for each channel in 20 MHz band indicating whether or not the SR initiator in the case of (1) can transmit an SR signal (sendable or unsendable).

In case of FIG. 10, SR transmission resource controller 107 allocates the frequency resource for the SR signal to the band where SR transmission is allowed (20 MHz channel with a low interference level). Meanwhile, SR transmission resource controller 107 does not allocate a frequency resource for the SR signal to the band where SR transmission is not allowed (20 MHz channel with a high interference level).

The average interference level of interference given to the SR responder depends on arrangement of APs around the SP responder. In addition, the primary channel configured by each AP is in units of 20 MHz, so that as to the interference given to the SR responder, it is assumed that the interference level greatly fluctuates in units of 20 MHz, depending on the arrangement of surrounding APs.

Therefore, defining the radio quality information in units of 20 MHz allows SR transmission resource controller 107 to allocate the frequency resource for the SR signal taking into consideration the increase or decrease of the interference level depending on the surrounding AP environment of the SR responder. Thus, it is made possible to prevent a decrease in the reception success rate of SR signals in SR responders and thus to improve the system performance.

Generation Method for Band Allocation Information for SR signals

Next, a detailed description will be given of the generation method for bandwidth allocation information (RU allocation information) for SR transmission signals in preamble generator 109 of radio communication apparatus 100 (SR initiator).

Preamble generator 109 determines the band allocation information (RU allocation information) based on the transmission band information inputted from SR transmission resource controller 107, taking into account the signaling bit amount and the degree of freedom of allocation.

For example, preamble generator 109 may generate the band allocation information by performing bitmap arrangement for a flag indicating the presence or absence of an allocation band for an SR signal for each predetermined band (e.g., in units of RUs or in units of 20 MHz). This allows the frequency resource for the SR signal to be allocated for each predetermined band without constraints (i.e., freely). Meanwhile, the signaling bit amount increases in bitmap arrangement for each predetermined band.

Alternatively, preamble generator 109 may generate the band allocation information by performing bitmap arrangement for a flag indicating the presence or absence of the allocation band for the SR signal for each RU group (RUG) composed of a plurality of consecutive RUs. As a result, the signaling bit mount can be reduced as compared with bitmap allocation in units of RUs. Meanwhile, there occurs a constraint in which the frequency resource allocation for an SR signal is in units of RUGs, and as a result, the scheduling gain is reduced compared with allocation in units of RUs.

Preamble generator 109 may generate the band allocation information by reusing RU Allocation subfield included in User Info field of the trigger frame. Accordingly, application of the allocation rules of existing systems makes implementation easier, and the signaling bit amount can be reduced as well. Meanwhile, there is a constraint on the frequency-resource allocation for an SR signal, which reduces the scheduling gain.

Preamble generator 109 may determine a generation method by taking into account an allowable amount of overhead (signaling bit amount) assumed in the radio communication system and an expected scheduling gain, and generate band allocation information. Accordingly, the system performance can be improved.

Note that, the above-described generation method for band allocation information for SR signals can be similarly applied to radio quality information generator 205 of the SR responder. Specifically, radio quality information generator 205 may indicate radio quality information, such as the magnitude of measured interference level, or availability of transmission of an SR signal (availability of reception), as 1-bit information for each predetermined band (e.g., RU or 20 MHz). In this case, as described above, radio quality information generator 205 may determine the generation method for radio quality information by taking into account the signaling bit amount and the degree of freedom of indication of radio quality information. Accordingly, radio quality information generator 205 can generate appropriate radio quality information taking into account the allowable amount for overhead and the expected scheduling gain assumed in the radio communication system, thereby making it possible to improve the system performance.

The generation method for band allocation information has been described, thus far.

Effects

As described above, according to the present embodiment, radio communication apparatus 100 (SR initiator) determines a transmission resource (frequency resource) for an SR signal transmitted by SR for an OBSS other than the BSS to which radio communication apparatus 100 belongs, based on radio quality information transmitted from radio communication apparatus 200 (SR responder), which is another radio communication apparatus in the BSS to which the apparatus belongs, and transmits the SR signal, using the determined transmission resource.

Thus, the SR initiator can determine the transmission resource (band) for the SR signal in accordance with the radio channel condition (e.g., interference state) in the SR responder and transmit the SR signal. Therefore, according to the present embodiment, the system performance can be improved by reducing the interference given by Non-SR transmission of an OBSS to the BSS (SR responder) performing SR transmission, and thus improving the reception success rate of the SR signal.

Further, in the present embodiment, the SR initiator transmits no SR signal in the band where the reception success rate of SR signals in the SR responder is determined to be low. Accordingly, it is made possible to prevent SR signals from becoming an interference source for an OBSS which is not subject to interference reduction and which is closer to the SR initiator than an OBSS subject to interference reduction is in the band where no SR signal is not transmitted.

Embodiment 2

In this embodiment, a description will be given of a method for controlling SR transmission by an SR initiator based on a BSS color.

In the following description, a group of BSSs having a particular BSS color is called "SRG (Spatial Reuse Group)."

The BSSs that belong to different SRGs are managed by different operators. Therefore, in the present embodiment, when performing SR transmission to an OBSS belonging to an SRG different from the BSS to which the SR initiator belongs, the SR initiator controls SR transmission such that no interference is given to a surrounding OBSS other than an OBSS for which SR transmission is to be performed.

The SR initiator and SR responder according to the present embodiment have the same basic configuration as radio communication apparatus 100 and radio communication apparatus 200 according to Embodiment 1, so that the SR initiator and SR responder will be described with reference to FIGS. 4 and 5.

Configuration of SR Initiator

Radio communication apparatus 100 (SR initiator) according to the present embodiment receives a radio frame including a trigger frame transmitted from an OBSS, then determines the availability of SR transmission based on the acquired BSS color of the OBSS or an SRG, and the radio quality information transmitted from the SR responder, and when SR transmission is available, radio communication apparatus 100 transmits an SR signal within a predetermined period.

Radio communication apparatus 100 according to the present embodiment is different from radio communication apparatus 100 according to Embodiment 1 in operation of SR transmission resource controller 107.

Further, the radio quality information held by radio quality information holder 106 is radio quality information for each SRG or for each BSS color (BSS).

Specifically, SR transmission resource controller 107 acquires, from control information included in the preamble inputted from decoder 104, a BSS color corresponding to the OBSS (OBSS to which OBSS STA that transmits a Non-SR signal belongs) that becomes an interference source for the SR signal.

Further, SR transmission resource controller 107 determines whether or not the OBSS (BSS color) which becomes an interference source for the SR signal is the same SRG as the BSS to which the apparatus belongs, based on the SRG information (e.g., SRG BSS Color Bitmap subfield) included in a beacon frame transmitted by an AP in the BSS to which the apparatus (radio communication apparatus 100) belongs. Note that, in the following description, the BSS having a BSS color belonging to the same group as the BSS color of the BSS (its BSS) to which the SR initiator and SR responder belong is simply referred to as "SRG," and the BSS having a BSS color belonging to another group is referred to as "Non-SRG."

SR transmission resource controller 107 determines the availability of SR transmission, based on radio quality information on each SRG or each BSS color, which is inputted from radio quality information holder 106. For example, SR transmission resource controller 107 determines the availability of SR transmission based on radio quality information on the group (SRG or Non-SRG) to which the OBSS that becomes an interference source to the SR signal belongs in the radio quality information for each SRG. Alternatively, SR transmission resource controller 107 determines the availability of SR transmission based on radio quality information on the BSS color corresponding to OBSS which becomes an interference source to the SR signal in the radio quality information on each BSS color.

When determining that SR transmission is not available, SR transmission resource controller 107 cancels SR transmission by turning OFF the output from SR transmission resource controller 107 or outputting information indicating that no SR transmission has been performed.

Meanwhile, when determining that SR transmission is available, SR transmission resource controller 107 determines the time resource and the transmission power resource for the SR signal as in Embodiment 1. That is, SR transmission resource controller 107 configures the transmission power inputted from SR transmission power reducer 105 as the transmission power resource. In addition, SR transmission resource controller 107 may configure a time shorter than the packet length of trigger-based PPDU (Non-SR signal) as a time resource. In addition, SR transmission resource controller 107 may configure a predetermined band in accordance with the transmission data size of the SR signal including the primary channel, for example, as the frequency resource.

SR transmission resource controller 107 outputs the determined SR transmission resource to encoder 108 and radio transceiver 101. Note that, a detailed description of a determination method for SR transmission resources according to a BSS or SRG in SR transmission resource controller 107 will be given, hereinafter.

Configuration of SR Responder

Radio communication apparatus 200 (SR responder) according to the present embodiment transmits radio quality information indicating an interference level, SINR, availability of SR transmission and/or the like for each group (SRG or Non-SRG) on a predetermined BSS color or each BSS color to radio communication apparatus 100, and also receives an SR signal from radio communication apparatus 100.

Radio communication apparatus 200 according to the present embodiment is different from radio communication apparatus 200 according to Embodiment 1 in operations of radio quality measurer 204 and radio quality information generator 205.

Specifically, radio quality measurer 204 measures radio quality in units of BSS colors or in units of SRGs. That is, radio quality measurer 204 measures the received power or interference level of the received signal inputted from radio transceiver 201 for each BSS color or for each SRG, and outputs the measurement result to radio quality information generator 205.

Radio quality information generator 205 generates radio quality information for each BSS color or radio quality information for each SRG by using the measurement result of the radio quality, which is measured in units of BSS colors or in units of SRGs.

Determination Method for Availability of Transmission of SR Signals

Next, a detailed description will be given of a determination method for availability of transmission of SR signals in SR transmission resource controller 107 of radio communication apparatus 100 (SR initiator).

SR transmission resource controller 107 determines the availability of SR transmission based on the radio quality information received from the SR responder.

Radio Quality Information

The BSS which is a Non-SRG is managed by an operator different from an operator managing the BSS which is an SRG (including its BSS). For this reason, when the SR initiator applies SR transmission to the OBSS which is a Non-SRG, it is assumed that the interference given to an OBSS other than the target OBSS is reduced.

Therefore, in the present embodiment, radio quality measurer 204 of the SR responder determines the BSS color of the received signal and measures the radio quality of each of the SRG and Non-SRG (e.g., interference level).

Then, radio quality information generator 205 of the SR responder respectively configures the SRG and Non-SRG with thresholds, and determines that SR transmission is available (that is, SR signal can be received) when the interference level of the received signal, which is measured by radio quality measurer 204, is equal to or less than the threshold and determines that the SR transmission is not available when the interference level is equal to or greater than the threshold (that is, SR signal cannot be received). That is, the radio quality information indicates the radio quality for each of the SRG and Non-SRG. For example, FIG. 11 illustrates the radio quality information (SR availability information) indicating the availability of an SR signal with respect to the SRG and Non-SRG, which is generated by radio quality information generator 205.

Thus, the availability of SR transmission can be determined by taking into account the increase or decrease of the interference level for each SRG and Non-SRG depending on an OBSS environment around the SR responder, so that it is made possible to prevent a decrease in the reception success rate of SR signals in the SR responder and thus to improve the system performance.

Note that, as described above, since a Non-SRG is managed by an operator different from an operator managing the BSS to which the SR initiator and SR responder belong, it is desirable that the interference given by SR-transmission for the Non-SRG be small. In this respect, for example, in order to reduce the interference given by SR transmission to the OBSS, which is a Non-SRG, when the radio quality information is generated in the SR responder, the threshold for the interference level of a Non-SRG may be small as compared with the threshold for the interference level of SRG. Accordingly, the possibility of SR transmission being applied to the Non-SRG as compared with an SRG is reduced. In this manner, the possibility of receiving interference by SR transmission can be reduced in Non-SRG.

Further, radio quality information generator 205 may prohibit all SR transmissions to Non-SRG and configure an SRG with a threshold for the interference level. For example, radio quality information generator 205 need not generate radio quality information for Non-SRG, and may set radio quality information for Non-SRG to be always unsendable. When the received signal is an SRG, SR radio resource controller 107 of the SR initiator may determine the availability of SR transmission based on the radio quality information. Accordingly, the SR initiator can determine the SR availability by taking into account the increase or decrease in the interference level of only SRG depending on the OBSS environment around SR responder, so that it is made possible to prevent a decrease in the reception success rate of SR signals in SR responders and thus to improve the system performance.

Further, the interference given to the SR responder depends on arrangement of surrounding OBSSs. It is assumed that a large interference is given to the SR responder from a particular OBSS depending on the arrangement of OBSSs. Thus, radio quality measurer 204 of the SR responder may measure the interference level in unis of BSS colors (i.e., in units of BSSs). Then, radio quality information generator 205 may configure all BSS colors with a threshold for an interference level common to all the BSS colors, and as illustrated in FIG. 12, radio quality information generator 205 may determine, for each BSS color, that SR transmission is available when the interference level is less than the threshold, and determine, for each BSS color, that SR transmission is not available when the interference level is equal to or greater than the threshold. That is, the radio quality information indicates the radio quality for each BSS. Thus, the SR availability can be determined by taking into account the increase or decrease in the interference level in units of individual OBSSs depending on an OBSS environment around the SR responder, so that it is made possible to prevent a decrease in the reception success rate of SR signals in SR responders and thus to improve the system performance.

Note that, the radio quality information to be broadcasted by an SR responder to SR initiators is not limited to the information indicating the availability of transmission of SR signals illustrated in FIGS. 11 and 12. For example, radio quality information indicating the interference level of each of SRG and Non-SRG may be broadcasted. In this case, SR transmission resource controller 107 of the SR initiator may determine the availability of SR transmission based on the interference level indicated in the radio quality information and the configured threshold.

In FIG. 11, the case has been described where the radio quality information for two groups of SRG and Non-SRG is used, but the radio quality information for three or more groups (e.g., SRG and a plurality of Non-SRGs) may be used.

Determination Method for Transmission Resources For SR Signals

Next, a detailed description will be given of a determination method for transmission resources for SR signals in SR transmission resource controller 107 of an SR initiator.

SR transmission resource controller 107 determines the availability of SR transmission based on the radio quality information received from the SR responder, and the BSS color of the received signal (OBSS signal). That is, SR transmission resource controller 107 determines the availability of SR transmission based on radio quality information of the group (SRG or Non-SRG) to which the BSS color included in the received signal belongs in the radio quality information (e.g., see FIG. 11 or 12) for each SRG/Non-SRG or each BSS color.

SR transmission resource controller 107 determines the time resource and transmission power resource for SR signals, as in Embodiment 1, when the determination result of SR transmission on the BSS color of the received signal is sendable. That is, SR transmission resource controller 107 configures the transmission power inputted from SR transmission power reducer 105, as the transmission power resource. In addition, SR transmission resource controller 107 may configure a time shorter than the packet length of a trigger-based PPDU (Non-SR signal) as the time resources. In addition, SR transmission resource controller 107 may configure a predetermined band in accordance with the transmission data size of the SR signal including the primary channel as the frequency resource.

Meanwhile, when the determination result of SR transmission with respect to a BSS color of the received signal indicates unsendable, SR transmission resource controller 107 cancels the SR transmission by turning off the output from SR transmission resource controller 107 or outputting information indicating that no SR transmission has been performed.

The determination method for transmission resources of SR signals has been described, thus far.

Effects

As described above, in the present embodiment, the SR initiator (radio communication apparatus 100) controls SR transmission in units of SRGs/Non-SRGs or in units of BSSs based on the radio quality information from the SR responder (radio communication apparatus 200). Accordingly, the SR initiator is allowed to preferentially apply SR transmission to an OBSS that is an SR sendable group or BSS (e.g., the group or BSS that give a small interference to the SR responder. Therefore, according to the present embodiment, the system performance can be improved by reducing the interference given by an OBSS to the SR responder, and thus improving the reception success rate of SR signals in SR responders.

Further, in the present embodiment, the SR initiator does not apply SR transmission to the SRG or the BSS for which the SR initiator has determined that the reception success rate of SR signals in the SR responder is low. Accordingly, it is possible to prevent SR signals from becoming an interference source to an OBSS that is not subject to interference reduction and that is closer to the SR initiator than an OBSS subject to interference reduction is.

As described above, it is assumed that a Non-SRG different from an SRG including a BSS to which the SR initiator and SR responder belong is managed by a different operator. In this respect, according to the present embodiment, the SR initiator cancels SR transmission in a case where the interference by Non-SR signal from an OBSS of Non-SRG is large and a decoding error of the SR signal in the SR responder is likely to occur, even when performing SR transmission for an OBSS belonging to an SRG different from the BSS to which the apparatus belongs. Thus, there is no interference due to SR transmission in Non-SRGs. That is, the SR initiator can control SR transmission so as not to give interference to a surrounding OBSS other than the OBSS which is an SR transmission target in Non-SRGs.

Embodiment 3

Regarding the transmission power for SR signals, the maximum power is derived by Equation 2 in order to reduce the interference to an OBSS, but the minimum power is not determined. Therefore, depending on the values of SRP and RSSI acquired from a trigger frame transmitted by the OBSS, the transmission power for the SR signal becomes small, and the reception success rate in the SR responder is reduced in some cases.

In this respect, in the present embodiment, a description will be given of a method for improving the reception success rate of SR signals in SR responders by guaranteeing the received qualities of the SR signals in the SR responders.

Configuration of SR Initiator

Figure 13:
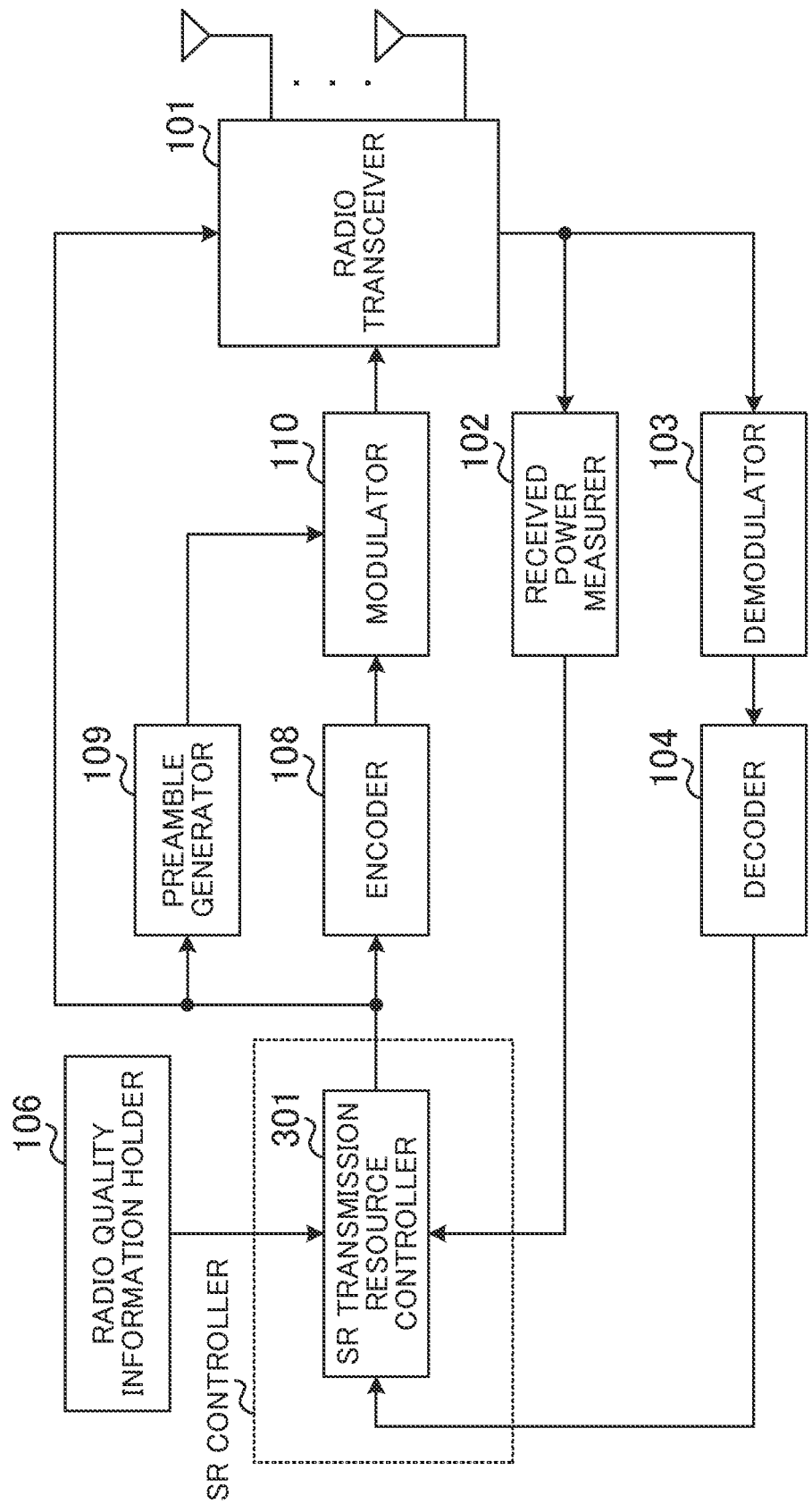
FIG. 13 is a block diagram illustrating a configuration example of a radio communication apparatus (SR initiator) according to Embodiment 3.

FIG. 13 is a block diagram illustrating a configuration example of radio communication apparatus 300 according to the present embodiment. Radio communication apparatus 300 (SR initiator) according to the present embodiment determines the availability of SR transmission based on information that can be acquired from a trigger frame of an OBSS (such as SRP and RSSI) and radio quality information from the SR responder, and when SR transmission is available, radio communication apparatus 300 (SR initiator) transmits an SR signal within a predetermined period.

In FIG. 13, the same components as those of Embodiment 1 (FIG. 4) are denoted by the same reference numerals, and their descriptions will not be repeated. Specifically, radio communication apparatus 300 is different from radio communication apparatus 100 according to Embodiment 1 in that radio communication apparatus 300 is not provided with SR transmission power reducer 105, and is different in operation of SR transmission resource controller 301.

The radio quality information to be held by radio quality information holder 106 is information indicating SINR in the SR responder when communication is performed from the SR initiator (radio communication apparatus 300) to the SR responder (radio communication apparatus 200).

Specifically, SR transmission resource controller 301 calculates transmission power for the SR signal (corresponding to allowable power to be described, hereinafter, i.e., transmission power calculated from SRP), using an SRP [dBm] included in a trigger frame inputted from decoder 104 and an RSSI ($RSSI_{trigger\ frame}$) of a trigger frame inputted from received power measurer 102.

SR transmission resource controller 301 calculates a guaranteed power that satisfies a predetermined packet error rate (PER) in the SR responder, based on radio quality information (SINR information) acquired from radio quality information holder 106.

When the transmission power calculated from the SRP does not satisfy the guaranteed power (when the transmission power is less than the guaranteed power), SR transmission resource controller 301 determines that SR transmission is not available, and cancels the SR transmission.

Meanwhile, when the transmission power calculated from the SRP satisfies the guaranteed power (when the transmission power calculated from the SRP is greater than the guaranteed power), SR transmission resource controller 301 determines that SR transmission is available, and determines the transmission resource for the SR signal. Specifically, SR transmission resource controller 301 determines the time resource and the frequency resource as in Embodiment 1 or 2. That is, SR transmission resource controller 301 configures a time shorter than the packet length of Trigger-based PPDU (Non-SR signal) as the time resource, and configures a predetermined band in accordance with the transmission data size of the SR transmission signal including a primary channel, as the frequency resource.

Further, SR transmission resource controller 301 determines the transmission power resources based on the transmission power calculated from the SRP and the guaranteed power. Note that, a detailed description of a determination method for SR transmission resources (transmission power resources) in SR transmission resource controller 301 will be given, hereinafter.

Configuration of SR Responder

The SR responder according to the present embodiment has the same basic configuration as radio communication apparatus 200 according to Embodiment 1, the SP responder will be described with reference to FIG. 5.

Radio communication apparatus 200 (SR responder) according to the present embodiment transmits, using a received signal from an SR initiator, the radio quality information indicating an SINR and/or the like to radio communication apparatus 100 and receives an SR signal from radio communication apparatus 100.

Radio communication apparatus 200 according to the present embodiment is different from radio communication apparatus 200 according to Embodiment 1 in operations of radio quality measurer 204 and radio quality information generator 205.

Specifically, radio quality measurer 204 measures the received quality (e.g., SINR) from the received signal of the SR initiator, which is inputted from the radio transceiver 201, and outputs the measurement result to radio quality information generator 205.

Radio quality information generator 205 generates a management frame or a control frame addressed to the SR initiator including the measurement result including the SINR inputted from radio quality measurer 204, and outputs the management frame or control frame to modulator 206.

Determination Method for Transmission Power for SR Transmission Signals

Next, a more detailed description will be given of the determination method for transmission power resources in SR transmission resource controller 301.

In a case where the SR initiator performs SR transmission to an OBSS, it is assumed that the reception success rate is reduced because the received SINR of the SR signal in the SP responder does not satisfy the required quality due to the influence of the interference to the SP responder based on the arrangement of surrounding OBSSs depending on the transmission power for the SR signal required by the reduction process of the interference given to the OBSS (i.e., the transmission power calculated from the SRP).

In this respect, SR transmission resource controller 301 of the SR initiator determines the transmission power for the SR signal based on the received quality indicated in the radio quality information received from the SR responder. The received quality illustrated in the radio quality information, herein, is, for example, an SINR when the SR initiator performs transmission to the SR responder with a predetermined power. Specifically, SR transmission resource controller 301 calculates the transmission power (guaranteed power) required for a PER of a predetermined MCS (e.g., the most robust MCS) to satisfy the target using SINR information included in the radio quality information.

Then, SR transmission resource controller 301 determines the transmission power ($TXPWR_{SR\ initiator}$) for the SR signal, using the calculated guaranteed power, the SRP [dBm] included in a trigger frame, and RSSI ($RSSI_{trigger\ frame}$) of a trigger frame inputted from received power measurer 102 as follows.

SR transmission resource controller 301 needs to keep the transmission power for the SR signal less than the power (referred to as allowable power ($TXPWR_{Allowed}$)) calculated according to the following Equation 3 in order to keep the interference given to the OBSS to be less than an allowable value.

$$TXPWR_{Allowed} = SRP - RSSI_{trigger\ frame} \quad (3)$$

Specifically, when the allowable power is greater than guaranteed power (Guaranteed power<$TXPWR_{Allowed}$), SR transmission resource controller 301 configures the transmission power ($TXPWR_{SR\ initiator}$) for the SR signal in the range (range in which the value is greater than the guaranteed power and less than the allowable power) illustrated in Equation 4.1. In this case, the SR initiator can use the transmission power that minimizes the interference given to the OBSS that is the SR transmission target, while guaranteeing the received quality in the SR responder. Accordingly, it is made possible to reduce the interference given to the OBSS which is not the SR transmission target, so that it is possible to increase the number of transmission opportunities for OBSSs and thus to improve the system performance.

[1]

$$TXPWR_{SR\ initiator} =$$
$$\begin{cases} \text{Guranteed power} < TXPWR_{SR\ initiator} < TXPWR_{Allowed} & (4.1) \\ \quad (\text{Guranteed power} < TXPWR_{Allowed}) \\ \text{Prohibit (Guranteed power} \geq TXPWR_{Allowed}) & (4.2) \end{cases}$$

Further, when the allowable power is equal to or less than the guaranteed power (Guaranteed power≥TXPWR$_{Allowed}$), SR transmission resource controller 301 cancels (prohibits) SR transmission because the transmission power for the SR signal does not satisfy the guaranteed power. As a result, the SR initiator can avoid SR-transmission with a low reception success rate in the SR responder. For this reason, it is made possible to prevent a decrease in the reception success rate of SR signals and thus to improve the system performance.

Effects

As described above, in the present embodiment, the SR initiator performs SR transmission with the transmission power that guarantees the received quality of the SR signal in the SR responder. That is, the SR initiator performs no SR transmission in a case where the received quality of the SR signal cannot be guaranteed in the SR responder. As described above, the SR initiator can determine the transmission resource (transmission power) for the SR signal in accordance with the radio channel condition (e.g., SINR) in the SR responder and transmit the SR signal. Therefore, according to the present embodiment, the reception success rate of SR signals is improved by reducing the interference given by the OBSS to the SR responder and also guaranteeing the received quality of the SR signal in the SR responder, and thus, the system performance can be improved.

Further, in the present embodiment, the SR initiator transmits no SR signals in the band where the reception success rate of SR signals in the SR responder is determined to be low. Accordingly, it is made possible to prevent the SR signal from becoming an interference source to an OBSS that subject to interference reduction and that is closer to the SR initiator than an OBSS subject to interference reduction target is.

Each embodiment of the present disclosure has been described, thus far.

Other Embodiments (1) At least two of Embodiments 1, 2, and 3 may be applied in combination. For example, an SR initiator may determine the availability of transmission of an SR signal in units of SRGs as described in Embodiment 2, and further, in the SRG with which the SR signal is sendable, the SR initiator may determine the availability of transmission of an SR signal in units of predetermined bands as described in Embodiment 1. Further, for example, the SR initiator may determine the availability of transmission of an SR signal as described in Embodiment(s) 1 and/or 2, and transmit the SR signal to satisfy the guaranteed power, as described in Embodiment 3.

(2) In radio communication apparatus 100 (see FIG. 4) according to Embodiments 1 and 2, the processing order of the processing of SR transmission resource controller 107 (i.e., determination of transmission resources) and the processing of SR transmission power reducer 105 (i.e., reduction of transmission power based on SRPs) may be switched. For example, when SR transmission resource controller 107 determines that SR transmission is not available (cancels SR transmission) based on the radio quality information, SR transmission power reducer 105 does not perform the processing. As a result, the processing amount in radio communication apparatus 100 can be reduced.

(3) When receiving a BSS signal or OBSS signal, the SR responder may update the radio quality information and broadcast the radio quality information addressed to the STAs in the BSS to which SR responder belongs.

(4) In the above embodiment, the case has been described where the SR initiator is an STA, and the SR responder is an AP, but the present invention is not limited to this case. For example, the embodiment described above can be applied even when the SR initiator is an AP and the SR responder is an STA, and the same effects can be obtained.

Note that, the operation when the SR initiator is an AP and the SR responder is an STA is the same as the operation example illustrated in FIG. 6. That is, as in FIG. 6, the SR responder (STA) transmits the radio quality information to the SR initiator (AP) in a predetermined cycle or at a predetermined timing. The SR initiator (AP) determines the availability of SR transmission based on the radio quality information from the SR responder (STA), and when SR transmission is available, the SR initiator (AP) performs SR transmission, using the available transmission resource.

Note that, the SR initiator (AP) may transmit a signal (radio quality information request signal) requesting radio quality information to the STAs in the BSS to which the SR initiator belongs (not illustrated). The STA that has received the radio quality information request signal transmits a response signal including the radio quality information to the SR initiator. For example, the SR initiator (AP) may use a trigger frame (trigger frame whose trigger type is bandwidth query report poll (BQRP)) requesting the STA for transmission of bandwidth query report (BQR), as the radio quality information request signal, and transmit the trigger frame to STAs in the BSS to which the SR initiator belongs. In this case, the STA transmits the BQR as the radio quality information, as a response signal to the radio quality information requesting signal. As described above, the process requesting the radio quality information can be easily issued by using radio quality information acquisition means already defined in 11ax.

In addition, the above embodiment can be applied even when both of the SR initiator and SR responder are STAs, and the same effects can be obtained.

(5) In the above embodiment, SRP-based SR (DSRP_PPDU-based SR) using a trigger frame of an OBSS has been described as an example, but the above embodiment can be applied to another SRP-based SR, and the same effect can be obtained.

When the above-described embodiment is applied to the other SRP-based SR, the method for acquiring an SRP and the method for measuring an RSSI are different as compared with DSRP_PPDU-based SR. Incidentally, the other SRP-based SR includes, for example, TSRP (Trigger-based SRP)_PPDU-based SR, using PPDU other than a trigger frame of an OBSS, ULSRP (Uplink SRP)_PPDU-based SR using a beacon and a response frame of an OBSS, or DLSRP (Downlink SRP)_PPDU-based SR using CTS (Clear to Send) of an OBSS (e.g., see NPL 1). Hereinafter, these SRP-based SR methods are referred to as "SRP-based SR using a preceding signal."

Figure 14:
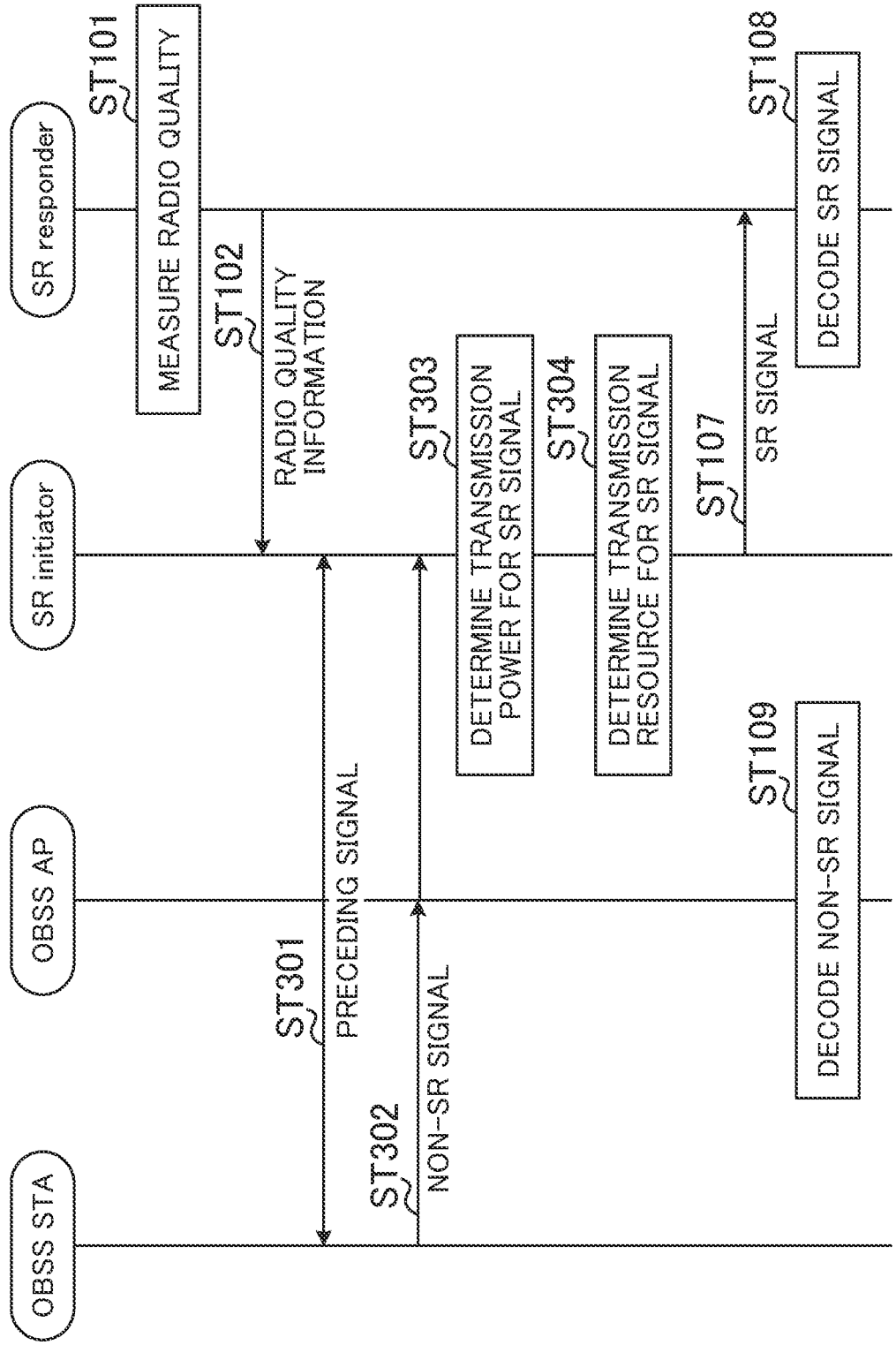
FIG. 14 is a sequence diagram illustrating an operation example of SRP-based SR using a preceding signal according to another embodiment.

FIG. 14 is a sequence diagram illustrating an operation example of SRP-based SR using a preceding signal. Note that, in FIG. 14, the same operations as those in FIG. 6 are denoted by the same reference numerals, and their descriptions will not be repeated.

In FIG. 14, the OBSS AP transmits a preceding signal to the OBSS STA (ST301). The preceding signal is a signal having the same BSS color as the signal transmitted by the OBSS STA. Specifically, the preceding signal is a PPDU, a beacon frame, a CTS frame, a BlockACK (BA) frame, or an Acknowledgement (ACK) frame that cannot be identified from a trigger frame.

In ST301, the SR initiator receives the preceding signal transmitted by the OBSS AP, measures an RSSI for each frame type of the received preceding signal and saves the RSSI.

The SR initiator then receives a Non-SR signal transmitted by the OBSS STA and addressed to the OBSS AP and acquires the packet lengths of the SRP and Non-SR signal based on the Non-SR signal (ST302). In addition, the SR initiator identifies the PPDU format in the Non-SR signal and acquires an RSSI of a signal satisfying a predetermined condition (e.g., the frame type corresponding to the PPDU format) from among the RSSIs of the saved preceding signals. The SR initiator then determines the transmission power for the SR signal to reduce interference to the OBSS AP (e.g., see Equation 2), using the acquired SRP and RSSI (ST303). In addition, the SR initiator determines an SR transmission period (SRP opportunity) based on the acquired packet length of the Non-SR signal (ST304).

That is, in FIG. 14, the SR initiator is different from FIG. 6 in that the SR initiator acquires the packet lengths of the SRP and Non-SR signal from the Non-SR signal transmitted from the OBSS, and that the SR initiator acquires the RSSI measured from the preceding signal in accordance with the format of the Non-SR signal.

Figure 15:
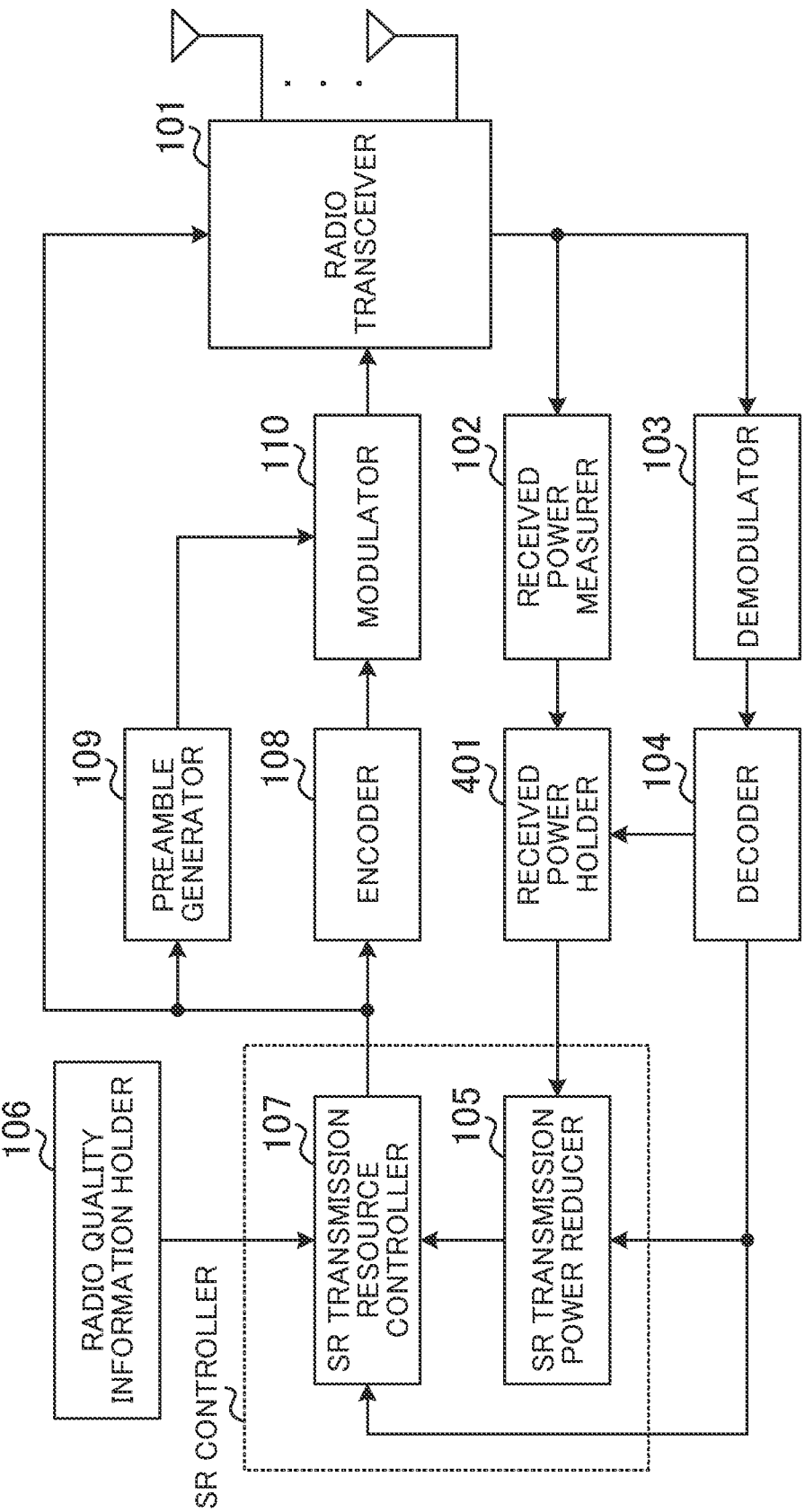
FIG. 15 is a block diagram illustrating a configuration example of a radio communication apparatus (SR initiator) that performs SRP-based SR, using the preceding signal according to the other embodiment.

FIG. 15 is a block diagram illustrating a configuration example of radio communication apparatus 400, which is an SR initiator for performing SRP-based SR using a preceding signal. Note that, in FIG. 15, the same components as those of Embodiment 1 (FIG. 4) are denoted by the same reference numerals, and their descriptions will not be repeated. Specifically, radio communication apparatus 400 is different from FIG. 4 in that radio communication apparatus 400 includes received power holder 401.

Received power holder 401 acquires an RSSI measured using a preceding signal of an OBSS from received power measurer 102 and saves the RSSI for a predetermined period of time. Further, received power holder 401 acquires a BSS color, a data format, and SRP information that can be acquired from a Non-SR signal of the OBSS from decoder 104, and saves the acquired information for a predetermined period of time.

Then, when a PPDU having a predetermined SRP is inputted, received power holder 401 outputs an RSSI of a preceding signal satisfying a predetermined condition corresponding to the format of the inputted PPDU to SR transmission power reducer 105. Meanwhile, received power holder 401 saves the information contained in the inputted signal, when a signal with no predetermined SRP is inputted or when an RSSI of a preceding signal that satisfies the predetermined condition is not held. In this case, the SR initiator (e.g., SR controller) cancels SR transmission.

(6) Although the above embodiment has been described with the assumption of SRP-based SR, the above embodiment can be applied to the cases of OBSS PD-based SR, and the same effects can be obtained.

Figure 16:
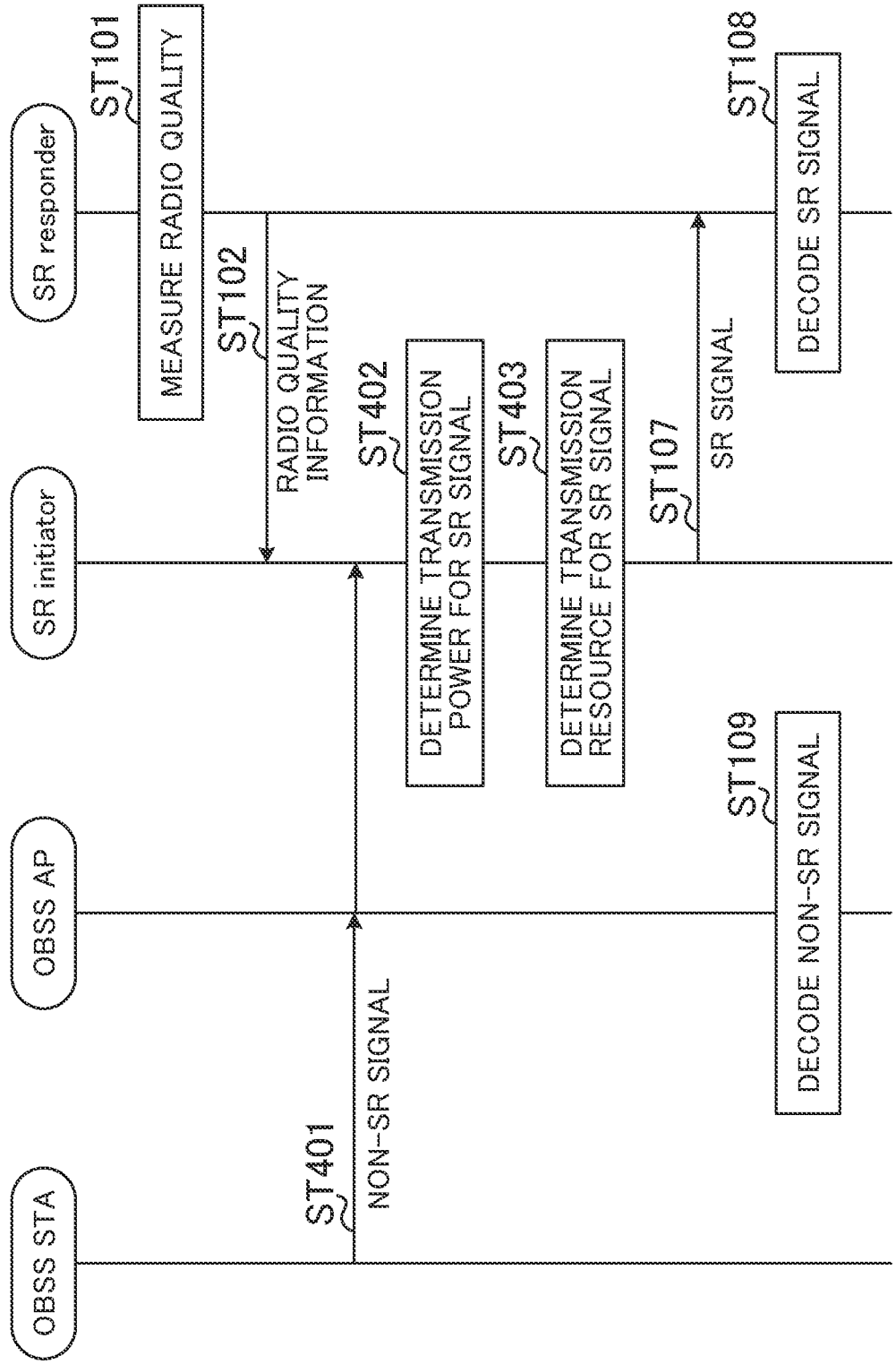
FIG. 16 is a sequence diagram illustrating an operation example of OBSS PD-based SR, according to the other embodiment.

FIG. 16 is a sequence diagram illustrating an operation example of OBSS PD-based SR. In FIG. 16, the same operations as those in FIG. 6 are denoted by the same reference numerals, and their descriptions will not be repeated.

In FIG. 16, the OBSS STA transmits a non-SR signal to the OBSS AP (ST401). At this time, the SR initiator has received the Non-SR signal transmitted from the OBSS STA to the OBSS AP.

The SR initiator determines whether the OBSS is an SRG or Non-SRG based on the BSS color of the Non-SR signal transmitted by the OBSS STA, and when the received power for the Non-SR signal is a received power less than or equal to the $OBSS\_PD_{Threshold}$ determined based on Equation 5 below, the SR initiator determines the transmission power for the SR signal (ST402). At this time, the SR initiator does not take the interference allowable value of the OBSS AP into consideration.

[2]

$$OBSS\_PD_{Threshold} = \max\left[\min\left(\begin{array}{c}OBSS\_PD_{Threshold\_min}\\ OBSS\_PD_{Threshold\_max}\\ OBSS\_PD_{Threshold\_min} + (TXPWR_{ref} - TTXPWR)\end{array}\right)\right]$$

(5)

In Equation 5, $OBSS\_PD_{Threshold\_Min}$ is the minimum value taken by $OBSS\_PD_{Threshold}$, and $OBSS\_PD_{Threshold\_max}$ is the maximum value taken by $OBSS\_PD_{Threshold}$. $TXPWR_{ref}$ is a reference transmission power and TXPWR is the SR transmission power.

Next, the SR initiator then determines the transmission resource for the SR signal with which the desired received quality can be expected, based on the radio quality information on a predetermined transmission resource received from the SR responder (ST403). The SR transmission power is expressed by the following Equations 6.1 and 6.2 based on the operation and Equation 5 described in Embodiment 3.

[3]

$$TXPWR_{max} = \begin{cases} \text{Guranteed power} < TXPWR_{max} & (OBSS\_PD_{level} \leq OBSS\_PD_{min}) \quad (6.1)\\ \text{Guranteed power} <\\ TXPWR_{max} < TXPWR_{ref} -\\ (OBSS\_PD_{level} - OBSS\_PD_{min}) \end{cases} \begin{pmatrix} OBBS\_PD_{max} \geq\\ OBSS\_PD_{level} > OBSS\_PD_{min} \end{pmatrix} (6.2)$$

In case of Equation (6.1), when the received level ($OBSS\_PD_{level}$) from the OBSS is less than or equal to the minimum value ($OBSS\_PD_{min}$) of the OBSS level, it is sufficient that the maximum SR transmission power ($TXPWR_{max}$) satisfies a value greater than the guaranteed power. Meanwhile, in case of Equation 6.2, the SR transmission power is defined within a range of a value greater than the guaranteed power to a value less than the reference transmission power, when the received level from the OBSS takes a value within the range between the maximum value ($OBSS\_PD_{max}$) and the minimum value of the OBSS PD threshold. When Equations 6.1 and 6.2 are not satisfied, the SR initiator cancels SR-transmission.

That is, in OBSS PD-based SR, the SR initiator is different from the SRP-based SR described in the embodiment described above with respect to the following two points: the SR initiator does not perform interference reduction processing for a particular OBSS based on the information obtained from the signal of an OBSS AP as in the above embodiment; and the operation in the power control method of Embodiment 3 (Equations 6.1 and 6.2) is different.

(7) In the above embodiment, the case has been described in which an RSSI is used as an example of received power, but the parameter representing received power is not limited to the RSSI. In addition, although the description has been given of the case where an SINR is used as an example of the received quality when communication is performed from the SR initiator to the SR responder, the parameter representing the received quality is not limited to the SINR.

(8) The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be implemented in apparatuses, devices, and systems of any kind, each being provided with a communication function, (collectively referred to as "communication apparatuses"). Non-limiting examples of the communication apparatuses include telephones (such as portable phones and smartphones), tablets, personal computers (PCs) (such as laptops, desktops, and notebooks), cameras (such as digital still/video cameras), digital players (such as digital audio/video players), wearable devices (such as wearable cameras, smartwatches, and tracking devices), game consoles, digital book readers, telehealth telemedicine (remote healthcare medicine prescription) devices, communication-function-equipped vehicles or transportation (such as automobiles, airplanes and ships), and a combination of the above mentioned apparatuses of various kinds.

The communication apparatuses are not limited to portable or mobile apparatuses and thus include unportable or fixed apparatuses, devices, and systems of any kind, such as smart home devices (e.g., appliances, lighting equipment, smart meters or measuring instruments, and control panels), vending machines, and Internet of Things ("IoT" (every "things" that may exist on networks.

In addition to data communication via cellular systems, wireless LAN systems, communication satellite systems and/or the like, communication includes data communication via a combination of these systems.

Moreover, the communication apparatuses include devices, such as controllers or sensors to be connected to or linked to a communication device which executes communication functions described in the present disclosure. Controllers or sensors are included, for example, each of which is configured to generate a control signal and/or a data signal used by the communication device which executes the communication functions of the communication apparatuses.

Further, the communication apparatuses include infrastructure equipment which performs communication with the above-mentioned non-limiting apparatuses of various kinds or which controls these non-limiting apparatuses of various kinds, such as base stations, access points, apparatuses of any other kinds, devices, and systems.

A radio communication apparatus according to the present disclosure includes: control circuitry, which, in operation, determines a transmission resource for a Spatial Reuse (SR) signal based on radio quality information transmitted from another radio communication apparatus in a first Basic Service Set (BSS), the SR signal being transmitted by SR for a second BSS which is a BSS other than the first BSS; and transmission circuitry, which, in operation, transmits the SR signal, using the transmission resource.

In the radio communication apparatus according to the present disclosure, the control circuitry determines, based on the radio quality information, a band where the SR signal is sendable, and the transmission circuitry transmits the SR signal in the band where the SR signal is sendable, and the transmission circuitry does not transmit the SR signal in a band other than the band where the SR signal is sendable.

In the radio communication apparatus according to the present disclosure, the control circuitry determines the transmission resource when transmitting the SR signal in a period obtained based on a signal from the second BSS, and the control circuitry does not determine the transmission resource when not transmitting the SR signal in the period.

In the radio communication apparatus according to the present disclosure, the radio quality information indicates radio quality for each predetermined band.

In the radio communication apparatus according to the present disclosure, the predetermined band is a band in units of resource units (RUs).

In the radio communication apparatus according to the present disclosure, the predetermined band is a band in units of 20 MHz.

In the radio communication apparatus according to the present disclosure, the radio quality information indicates any of: whether or not the SR signal is receivable in the other radio communication apparatus; whether or not an interference level in the other radio communication apparatus is lower than a threshold; the interference level in the other radio communication apparatus; and received quality when communication is performed from the radio communication apparatus to the other radio communication apparatus.

In the radio communication apparatus according to the present disclosure, the radio quality information indicates radio quality of each of the BSSs.

In the radio communication apparatus according to the present disclosure, the radio quality information indicates radio quality for a BSS that belongs to a first group including the first BSS, and radio quality for a BSS that belongs to a second group which is different from the first group.

In the radio communication apparatus according to the present disclosure, the radio quality information includes received quality when communication from the radio communication apparatus to the other radio communication apparatus is performed, and the control circuitry calculates, based on the received quality, a first transmission power satisfying a predetermined error rate in the other radio communication apparatus, calculates a second transmission power based on a signal from the second BSS, and when the second transmission power is greater than the first transmission power, the control circuitry determines transmission of the SR signal.

In the radio communication apparatus according to the present disclosure, the transmission power for the SR signal is greater than the first transmission power and is less than the second transmission power.

A radio communication method according to the present disclosure includes: determining a transmission resource for a Spatial Reuse (SR) signal based on radio quality information transmitted from another radio communication apparatus in a first Basic Service Set (BSS), the SR signal being transmitted by SR for a second BSS other than the first BSS; and transmitting the SR signal, using the transmission resource.

The disclosure of Japanese Patent Application No. 2018-035456, filed on Feb. 28, 2018, including the specification, drawings, and abstract is incorporated herein by reference in its entirety.

INDUSTRIAL APPLICABILITY

One exemplary embodiment of the present disclosure is useful in radio communication systems.

REFERENCE SIGNS LIST 100, 200, 300, 400 Radio communication apparatus
101, 201 Radio transceiver
102 Received power measurer
103, 202 Demodulator
104, 203 Decoder
105 SR transmission power reducer
106 Radio quality information holder
107, 301 SR transmission resource controller
108 Encoder
109 Preamble generator
110, 206 Modulator
204 Radio quality measurer
205 Radio quality information generator
401 Received power holder

The invention claimed is:

1. A radio communication apparatus, comprising:
control circuitry, which, in operation, determines a transmission resource for a Spatial Reuse (SR) signal based on radio quality information transmitted from another radio communication apparatus, wherein the radio quality information is set based on a measurement result acquired by the another radio communication apparatus; and
transmission circuitry, which, in operation, transmits the SR signal using the transmission resource in an SR operation with respect to one or more radio communication apparatuses other than the radio communication apparatus.

2. The radio communication apparatus according to claim 1, wherein
the radio communication apparatus and the another radio communication apparatus belong to a first Basic Service Set (BSS), and
the one or more radio communication apparatuses other than the radio communication apparatus belong to a second BSS which is an overlapping BSS of the first BSS.

3. The radio communication apparatus according to claim 2, wherein
the control circuitry determines, based on the radio quality information, a band in which the SR signal is sendable, and
the transmission circuitry transmits the SR signal in the band in which the SR signal is sendable, and does not transmit the SR signal in a band other than the band in which the SR signal is sendable.

4. The radio communication apparatus according to claim 2, wherein
the control circuitry determines the transmission resource when transmitting the SR signal in a period defined by a signal from the second BSS, and
the control circuitry does not determine the transmission resource when not transmitting the SR signal in the period.

5. The radio communication apparatus according to claim 2, wherein the radio quality information indicates radio quality of each band.

6. The radio communication apparatus according to claim 5, wherein each band is a band in units of resource units (RUs).

7. The radio communication apparatus according to claim 5, wherein each band is a band in units of 20 MHz.

8. The radio communication apparatus according to claim 2, wherein
the radio quality information indicates one of: whether or not the SR signal is receivable by the another radio communication apparatus; whether or not an interference level in the another radio communication apparatus is lower than a threshold; the interference level in the another radio communication apparatus; or received quality of communication from the radio communication apparatus to the another radio communication apparatus.

9. The radio communication apparatus according to claim 2, wherein the radio quality information indicates radio quality of each of the first BSS and the second BSS.

10. The radio communication apparatus according to claim 2, wherein the radio quality information indicates radio quality of a BSS that belongs to a first group including the first BSS, and radio quality of a BSS that belongs to a second group which is different from the first group.

11. The radio communication apparatus according to claim 2, wherein
the radio quality information includes received quality of communication from the radio communication apparatus to the another radio communication apparatus, and
the control circuitry calculates, based on the received quality, a first transmission power satisfying a predetermined error rate in the another radio communication apparatus, calculates a second transmission power based on a signal from the second BSS, and responsive to the second transmission power exceeding the first transmission power, determines to transmit the SR signal.

12. The radio communication apparatus according to claim 11, wherein a transmission power of the SR signal is greater than the first transmission power and is less than the second transmission power.

13. A radio communication method implemented by a radio communication apparatus, the radio communication method comprising:
- determining a transmission resource for a Spatial Reuse (SR) signal based on radio quality information transmitted from another radio communication apparatus, wherein the radio quality information is set based on a measurement result acquired by the another radio communication apparatus; and
- transmitting the SR signal using the transmission resource in an SR operation with respect to one or more radio communication apparatuses other than the radio communication apparatus.

* * * * *